United States Patent
Itoh

(10) Patent No.: US 11,052,777 B2
(45) Date of Patent: Jul. 6, 2021

(54) METHOD OF CHARGING ELECTRIC AUTONOMOUS MOVING BODY

(71) Applicant: Toyota Jidosha Kabushiki Kaisha, Toyota Aichi-ken (JP)

(72) Inventor: Masayuki Itoh, Nagoya Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 248 days.

(21) Appl. No.: 16/256,575

(22) Filed: Jan. 24, 2019

(65) Prior Publication Data

US 2019/0232810 A1 Aug. 1, 2019

(30) Foreign Application Priority Data

Jan. 26, 2018 (JP) .............................. JP2018-011917

(51) Int. Cl.
| | |
|---|---|
| *B60L 53/16* | (2019.01) |
| *H02J 7/00* | (2006.01) |
| *B60L 53/30* | (2019.01) |
| *G05D 1/00* | (2006.01) |
| *H02J 1/00* | (2006.01) |

(52) U.S. Cl.
CPC .............. *B60L 53/16* (2019.02); *B60L 53/30* (2019.02); *G05D 1/0088* (2013.01); *H02J 7/0013* (2013.01); *H02J 7/0027* (2013.01); *H02J 7/0042* (2013.01); *H02J 1/00* (2013.01)

(58) Field of Classification Search
CPC .................................... H02J 7/00; B60L 53/16
See application file for complete search history.

(56) References Cited

U.S. PATENT DOCUMENTS

| | | | | |
|---|---|---|---|---|
| 6,087,806 A | * | 7/2000 | Fujioka ................... | B60L 53/32 320/109 |
| 2004/0130292 A1 | * | 7/2004 | Buchanan ............... | B60L 55/00 320/116 |
| 2016/0193932 A1 | | 7/2016 | Vaghefinazari | |

FOREIGN PATENT DOCUMENTS

| | | |
|---|---|---|
| CN | 105083354 A | 11/2015 |
| EP | 3184353 A1 | 6/2017 |
| JP | 2001147718 A | 5/2001 |
| JP | 2013090416 A | 5/2013 |
| JP | 2017201846 A | 11/2017 |
| KR | 20110061797 A | 6/2011 |
| KR | 20120077171 A | 7/2012 |

* cited by examiner

*Primary Examiner* — Robert Grant
(74) *Attorney, Agent, or Firm* — Dinsmore & Shohl LLP

(57) ABSTRACT

When batteries of a plurality of electric autonomous moving bodies are charged, each of the electric autonomous moving bodies sends charging state information indicating a charging state of the battery of the electric autonomous moving body. A controller executes control for switching a charging state and a non-charging state of the battery of each of the electric autonomous moving body based on the charging state information of the batteries of the respective electric autonomous moving bodies in such a way that the total amount of current that flows through the batteries of the respective electric autonomous moving bodies does not exceed an allowable current of a charger unit and a power supply line.

5 Claims, 27 Drawing Sheets

METHOD OF CHARGING ELECTRIC AUTONOMOUS MOVING BODY

CROSS REFERENCE TO RELATED APPLICATIONS

This application is based upon and claims the benefit of priority from Japanese patent application No. 2018-011917, filed on Jan. 26, 2018, the disclosure of which is incorporated herein in its entirety by reference.

BACKGROUND

The present disclosure relates to a method of charging an electric autonomous moving body.

In recent years, techniques for charging electric autonomous moving bodies including batteries such as robots (personal mobility robots, cleaning robots etc.) or electric automobiles have been proposed.

For example, Japanese Unexamined Patent Application Publication No. 2013-090416 discloses a technique for charging a battery mounted on a moving body. According to the technique disclosed in Japanese Unexamined Patent Application Publication No. 2013-090416, batteries of a plurality of moving bodies can be charged by providing a plurality of power supply units and a plurality of power feed wires capable of connecting different batteries to the respective power supply units. On the other hand, by providing a changeover switch for integrating or separating the plurality of power supply units, when a battery of one moving body is charged, this battery can be rapidly charged by the integrated plurality of power supply units.

SUMMARY

In the technique disclosed in Japanese. Unexamined Patent Application Publication No. 2013-090416, however, one battery needs to be connected to one power supply unit when the batteries of the plurality of moving bodies are charged. Therefore, in order to charge the batteries of the plurality of moving bodies, it is required to embed the plurality of power supply units into a charging equipment, which causes the charging equipment to increase.

In order to solve the aforementioned problem, it may be possible to employ a configuration in which the plurality of moving bodies are aligned in a serial state, the power supply unit and the plurality of moving bodies are electrically connected to each other, and the batteries of the plurality of moving bodies are charged by one power supply unit. In this configuration, however, the batteries of the plurality of moving bodies need to be charged within a range of an allowable current of the power supply unit and the power supply line.

The present disclosure has been made in view of the aforementioned problems and provides a method of charging an electric autonomous moving body capable of performing charging within the range of the allowable current of the charger unit and the power supply line in the case in which the plurality of electric autonomous moving bodies are aligned in the serial state, the charger unit and the plurality of electric autonomous moving bodies are electrically connected to each other, and the batteries of the plurality of electric autonomous moving bodies are charged by one charger unit.

A method of charging an electric autonomous moving, body according to one aspect of the present disclosure is a method of charging an electric autonomous moving body by a charging system in which a plurality of electric autonomous moving bodies including batteries are aligned in a serial state, a charger unit and the plurality of electric autonomous moving bodies are electrically connected to each other, power is supplied from the charger unit to the respective electric autonomous moving bodies, and the batteries of the plurality of electric autonomous moving bodies are charged, in which the charger unit is provided with connection member electrically connected to the electric autonomous moving body, each of the electric autonomous moving bodies is provided with a first connection member capable of being electrically connected to the connection member of the charger unit and a second connection member capable of being electrically connected to the first connection member of another one of the electric autonomous moving bodies, the charging system includes a controller configured to execute control for switching a charging state and a non-charging, state of the batteries of the respective electric autonomous moving bodies, each of the electric autonomous moving bodies includes a communication function, and when the plurality of electric autonomous moving, bodies are aligned in the serial state, the charger unit and the plurality of electric autonomous moving bodies are electrically connected to each other via the connection member, the first connection member, and the second connection member, and the batteries of the plurality of electric autonomous moving bodies are charged, each of the electric autonomous moving bodies sends charging state information indicating the charging state of the battery of the electric autonomous moving body and the controller executes control for switching the charging state and the non-charging state of the batteries of the respective electric autonomous moving bodies based on the charging state information of the batteries of the respective electric autonomous moving bodies in such a way that the total amount of current that flows through the batteries of the respective electric autonomous, moving bodies does not exceed an allowable current of the charger unit and a power supply line.

According to the aspect of the present disclosure described above, it is possible to provide a method of charging an electric autonomous moving body capable of performing charging within the range of the allowable current of the charger unit and the power supply line in the case in which the plurality of electric autonomous moving bodies are aligned in the serial state and the batteries of the plurality of electric autonomous moving bodies are charged by one charger unit.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, embodiments of the present disclosure will be explained. Throughout the drawings in the following description, the same or corresponding elements are denoted by the same reference symbols and overlapping, descriptions will be omitted as appropriate for the sake of clarification of the description. Further, specific numerical values and the like stated in the following embodiments are merely examples for facilitating understanding of the present disclosure, and are not limited thereto.

(1) First Embodiment

Configuration of First Embodiment

External Configuration of Charging System According to First Embodiment

First, an external configuration of a charging system according to a first embodiment will be explained.

Figure 1:
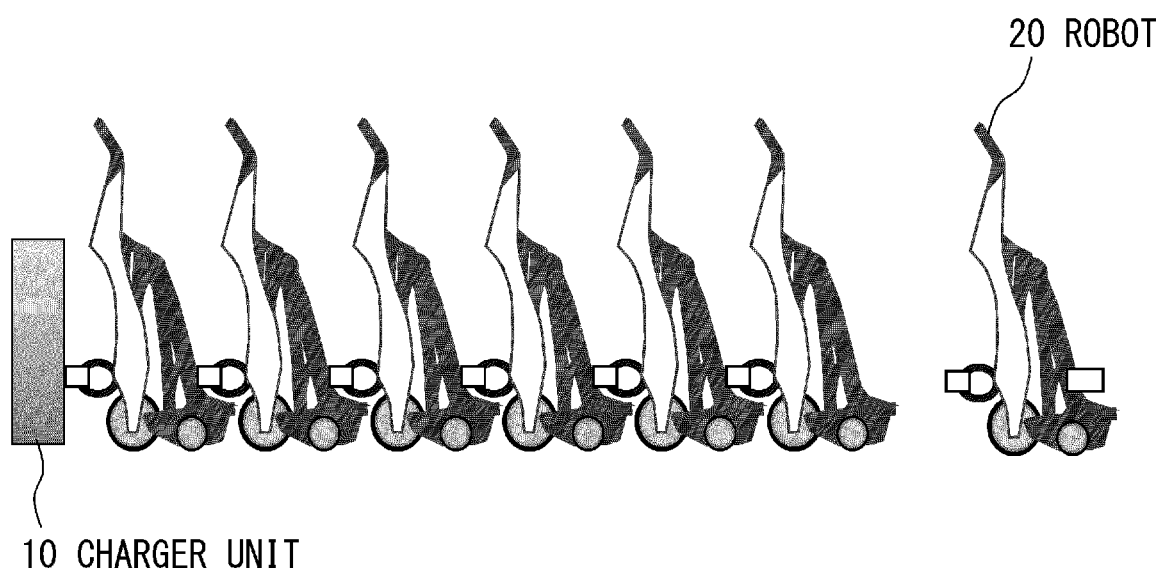
FIG. 1 is an external side view showing one example of an external configuration of a charging system according to a first embodiment.

FIG. 1 shows one example of the external configuration of the charging system according to the first embodiment. FIG. 1 shows an example in which an electric autonomous moving body is a robot (personal mobility robot) on which a user rides when traveling. However, the electric autonomous moving body according to the present disclosure is not limited to the robot shown in FIG. 1.

As shown in FIG. 1, in the charging system according to the first embodiment, one charger unit 10 that can charge batteries 205 (see FIG. 7 described later) of a plurality of robots 20 is provided for the plurality of robots 20 including, the batteries 205.

When the batteries 205 of the plurality of robots 20 are charged, the plurality of robots 20 are aligned in a serial state and the plurality of robots 20 are electrically connected with one another, and the robot 20 that is the closest to the charger unit 10 is electrically connected to the charger unit 10. Then power is supplied from the charger unit 10 to each of the robots 20 and the batteries 205 of the plurality of robots 20 are thus charged. Therefore, the robot 20 that is the closest to the charger unit 10 is supplied with power from the charger unit 10 directly and the other robots 20 are supplied with power from the charger unit 10 indirectly.

External Configurations of Charger Unit and Robot According to First Embodiment

Next, detailed external configurations of the charger unit 10 and the robot 20 according to the first embodiment will be explained.

Figure 2:
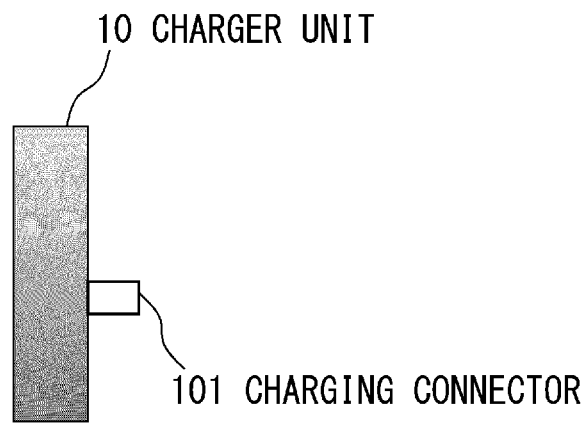
FIG. 2 is an external side view showing one example of an external configuration of a charger unit according to the first embodiment.
Figure 3:
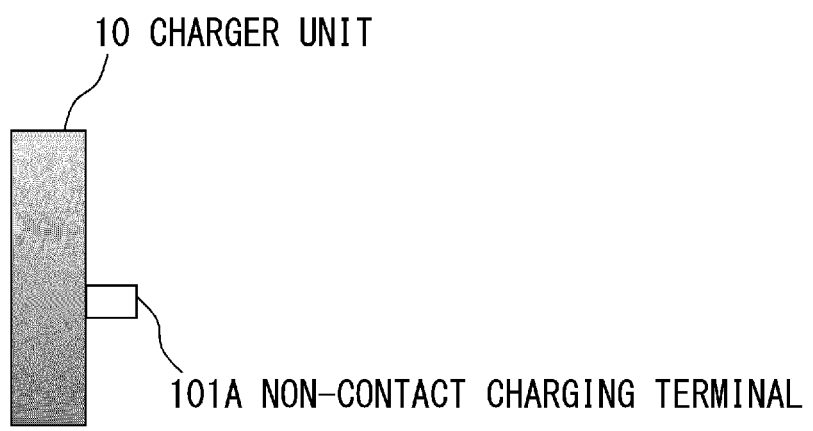
FIG. 3 is an external side view showing another example of the external configuration of the charger unit according to the first embodiment.

FIGS. 2 and 3 each show one example of the external configuration of the charger unit 10 according to the first embodiment.

The charger unit 10 includes one of a charging connector 101 shown in FIG. 2 and a non-contact charging terminal 101A shown in FIG. 3. The charging connector 101 and the non-contact charging terminal 101A are examples of connection member.

The charging connector 101 is a connector that can engage with a forward charging connector 201 (described later) of the robot 20 and can be electrically connected thereto in order to supply power to the robot 20. The non-contact charging terminal 101A is a terminal that can be electrically connected to a forward non-contact charging terminal 201A (described later) of the robot 20 in a state in which the non-contact charging terminal 101A does not contact the forward non-contact charging terminal 201A in such a way that the non-contact charging, terminal 101A is able to supply power to the robot 20.

Figure 4:
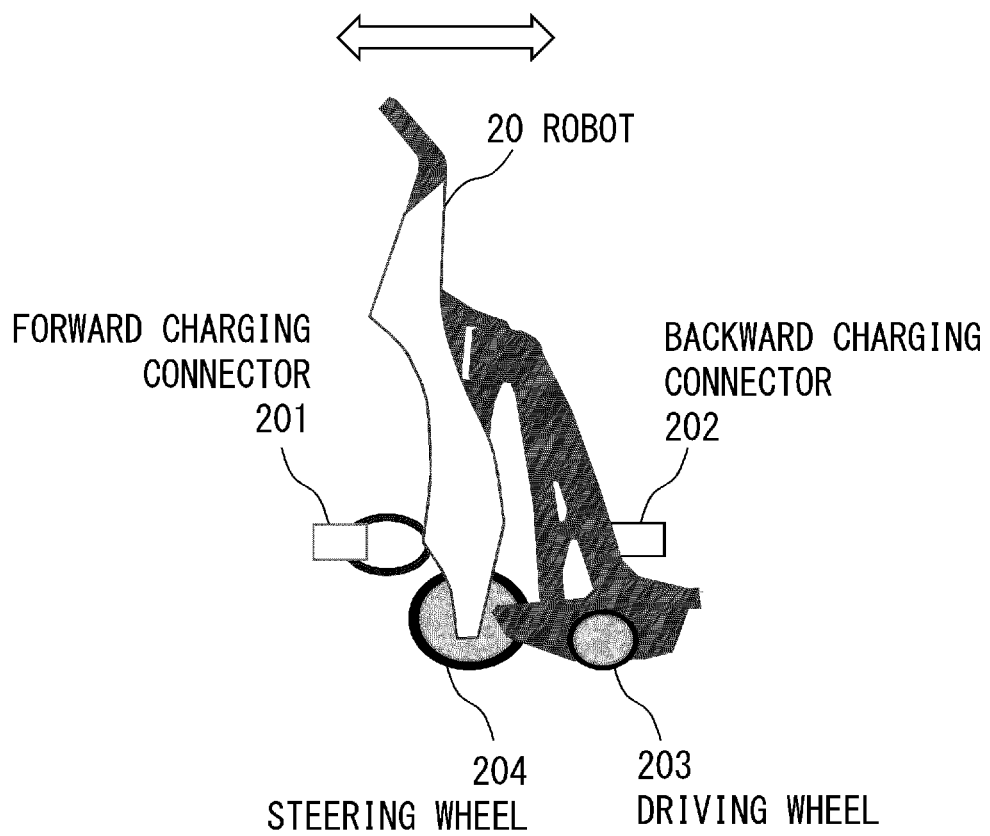
FIG. 4 is an external side view showing one example of an external configuration of a robot according to the first embodiment.
Figure 5:
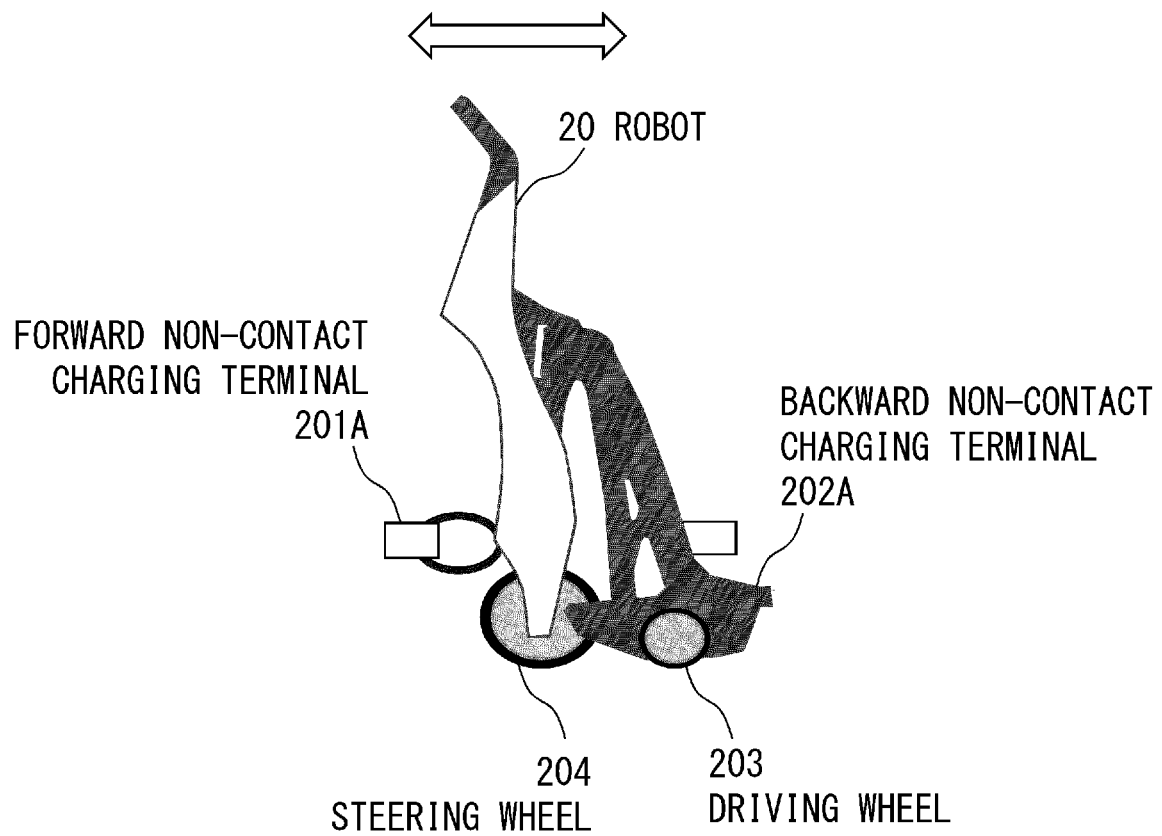
FIG. 5 is an external side view showing another example of the external configuration of the robot according to the first embodiment.

FIGS. 4 and 5 each show one example of the external configuration of the robot 20 according to the first embodiment.

The robot 20 includes driving wheels 203 and a steering wheel 204, and is a personal mobility robot on which a user rides when traveling. Further, the robot 20 includes the forward charging connector 201 and a backward charging connector 202 shown in FIG. 4 or the forward non-contact charging terminal 201A and a backward non-contact charging terminal 202A shown in FIG. 5. The forward charging connector 201 and the forward non-contact charging terminal 201A are examples of first connection member and the backward charging connector 202 and the backward non-contact charging terminal 202A are examples of second connection member.

The forward charging connector 201 is a connector that is provided in the front of the body of the robot 20 and can engage with the charging connector 101 of the charger unit 10 and can be electrically connected thereto in order to input the power supplied from the charger unit 10 directly or indirectly. The forward non-contact charging terminal 201A is a terminal that is provided in the front of the body of the robot 20 and can be electrically connected to the non-contact charging terminal 101A of the charger unit 10 in a state in which they do not contact each other in order to input the power supplied from the charger unit 10 directly or indirectly.

The backward charging connector 202 is a connector that is provided in the rear of the body of the robot 20 and can engage with the forward charging connector 201 of another robot 20 and can be electrically connected thereto in order to output power to the other robot 20. The backward non-contact charging terminal 202A is a terminal that is provided in the rear of the body of the robot 20 and can be electrically connected to the forward non-contact charging terminal 201A of another robot 20 in a state in which they do not contact each other in order to output power to the other robot 20.

It is sufficient that one of the charging connector 101 and the forward charging connector 201 be a male connector and the other one of them be a female connector, and it does not matter which one of them is the male or the female connector. It is also sufficient that one of the forward charging connector 201 and the backward charging connector 202 be a male connector and the other one of them be a female connector, and it does not matter which one of them is the male or the female connector.

Further, while the charging connector 101, the forward charging connector 201, and the backward charging connector 202 include at least wires for supplying power, they may include wires for detecting the electrical connection, wires for performing wired communication with another robot 20 or the like as necessary.

Further, when the connectors (the charging connector 101, the forward charging connector 201, and the backward charging connector 202) are used, the robots 20 need to be parked within a positional displacement allowance of the connectors. Therefore, from the viewpoint of reducing the positional displacement, it is more useful to use the non-contact charging terminals (the non-contact charging terminal 101A, the forward non-contact charging terminal 201A, and the backward non-contact charging terminal 202A). On the other hand, when the non-contact charging terminals are used, the number of electronic circuits increases and the cost increases. Therefore, from the viewpoint of reducing the cost, it is more useful to use the connectors. Therefore, which one of the connectors and the non-contact charging terminals should be used may be determined as appropriate depending on which one of the positional displacement and the cost should be prioritized.

In the first embodiment, the direction in which the robots 20 are aligned when the plurality of robots 20 are aligned in the serial state is set as the front-back direction of the robot 20, the forward charging connector 201 or the forward non-contact charging terminal 201A is arranged in the front of the body of the robot 20, and the backward charging connector 202 or the backward non-contact charging terminal 202A is arranged in the rear of the body of the robot 20. However, the present disclosure is not limited thereto. The direction in which the robots 20 are aligned may be a direction other than the front-back direction of the robot 20 (e.g., a direction that is tilted from the front-back direction, a lateral direction or the like). In this case, it is sufficient that the charging connector or the non-contact charging terminal on the output side be arranged in a position that is opposite to the body of the robot 20 with respect to the charging connector or the non-contact charging terminal on the input side in the direction in which the robots 20 are aligned.

Block Configurations of Charger Unit and Robot According to First Embodiment

Next, block configurations of the charger unit 10 and the robot 20 according to the first embodiment will be explained. In this example, block configurations in a case in which the charger unit 10 includes the charging connector 101 and the robot 20 includes the forward charging connector 201 and the backward charging connector 202 will be explained.

Figure 6:
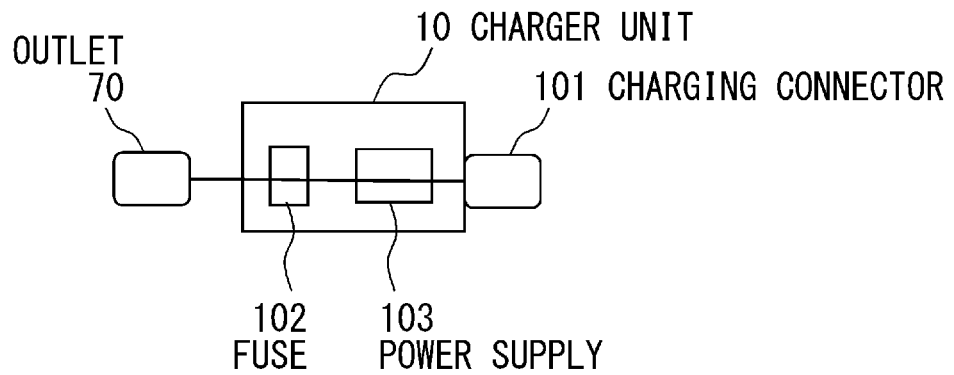
FIG. 6 is a block diagram showing one example of a block configuration of the charger unit according to the first embodiment.

FIG. 6 shows one example of a block configuration of the charger unit 10 according to the first embodiment.

The charger unit 10 shown in FIG. 6 includes, besides the aforementioned charging connector 101, a fuse 102 and a power supply 103.

The power supply 103 receives power from a commercial power supply (not shown) via an outlet 70 and supplies power to the robot 20 electrically connected to the charging connector 101. The robot 20 is supplied with various types of power depending on direct current, alternating current, a voltage capacity, and a current capacity etc.

The fuse 102 is arranged between the outlet 70 and the power supply 103. When the power is supplied from the outlet 70 to the power supply 103, the fuse 102 blows if an overcurrent flows, thereby protecting the power supply 103.

Figure 7:
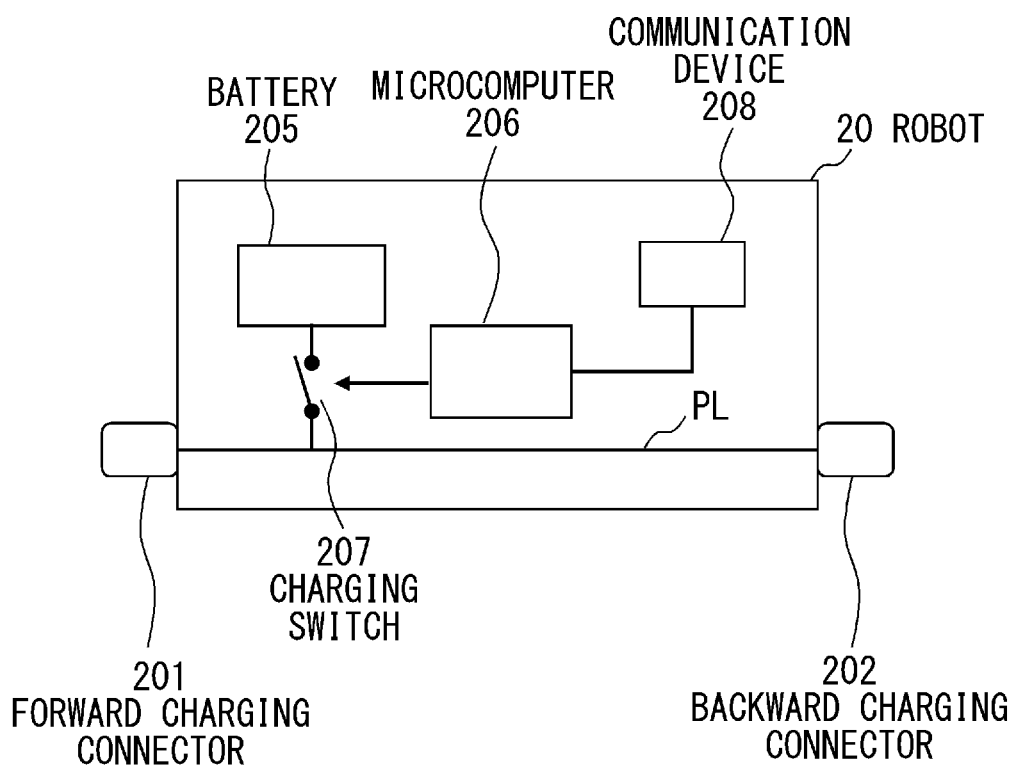
FIG. 7 is a block, diagram showing one example of a block configuration of the robot according to the first embodiment.

FIG. 7 shows one example of the block configuration of the robot 20 according to the first embodiment.

The robot 20 shown in FIG. 7 includes, besides the forward charging connector 201 and the backward charging connector 202 described above, the battery 205, a microcomputer 206, a charging switch 207, and a communication device 208.

The forward charging connector 201 and the backward charging connector 202 are electrically connected to each other via an electric wire PL inside the robot 20. Therefore, the power that has been supplied from the charger unit 10 directly or indirectly and has been input via the forward charging connector 201 can be output to another robot 20 via the backward charging connector 202.

The communication device 208 performs communication with an external device. In the first embodiment, the communication device 208 performs communication with another robot 20. When the charger unit 10 includes a communication function, the communication device 208 may perform communication with the charger unit 10. Further, the communication device 208 can communicate with an external server. While the communication system of the communication device 208 may be, for example, radio communication (e.g., wireless Local Area Network (LAN) communication, Bluetooth (registered trademark) communication), wired serial communication, or power communication, it is not particularly limited thereto.

The microcomputer 206 controls each of the components inside the robot 20 and executes the functions included in the robot 20.

In the first embodiment, the microcomputer 206 sends charging state information indicating a charging state (whether the battery is being charged or not being charged, and a remaining charge amount) of the battery 205 of the robot 20 of the microcomputer 206 to the other robots 20 via the communication device 208.

When the microcomputer 206 charges the batteries 205 of the respective robots 20, the microcomputer 206 executes control for switching the charging state and the non-charging state of the batteries 205 of the respective robots 20 in such a way that the total charging current that flows through the batteries 205 of the respective robots 20 does not exceed the allowable current of the charger unit 10 and the power supply line (the power line between the charger unit 10 and the robots 20) based on the charging state information of the batteries 205 of the robot 20 of the microcomputer 206 and the other robots 20. Therefore, in the first embodiment, the microcomputers 206 of the respective robots 20 serve as controllers.

When the microcomputer 206 charges the battery 205, the microcomputer 206 turns on the charging switch 207 and supplies power to the battery 205. Further, when the battery 205 is not charged, the microcomputer 206 turns off the charging switch 207 and stops power supply to the battery 205. When, for example, the battery 205 has been fully charged or an abnormality such as a situation in which the communication with another robot 20 is interrupted has occurred, or the electric connection with the charger unit 10 has been interrupted, the battery 205 is not charged.

Although the robot 20 includes a motor that drives the driving wheels 203 of the robot 20 to travel forward or backward, a motor amplifier that controls the driving of the motor and the like, these components are not shown in the drawings.

Operations of First Embodiment

Next, operations of the charging system according to the first embodiment will be explained.

As a usage form of the robot 20 according to the first embodiment, it is possible to assume a form in which many users use robots 20 in the form of the sharing.

Figure 8:
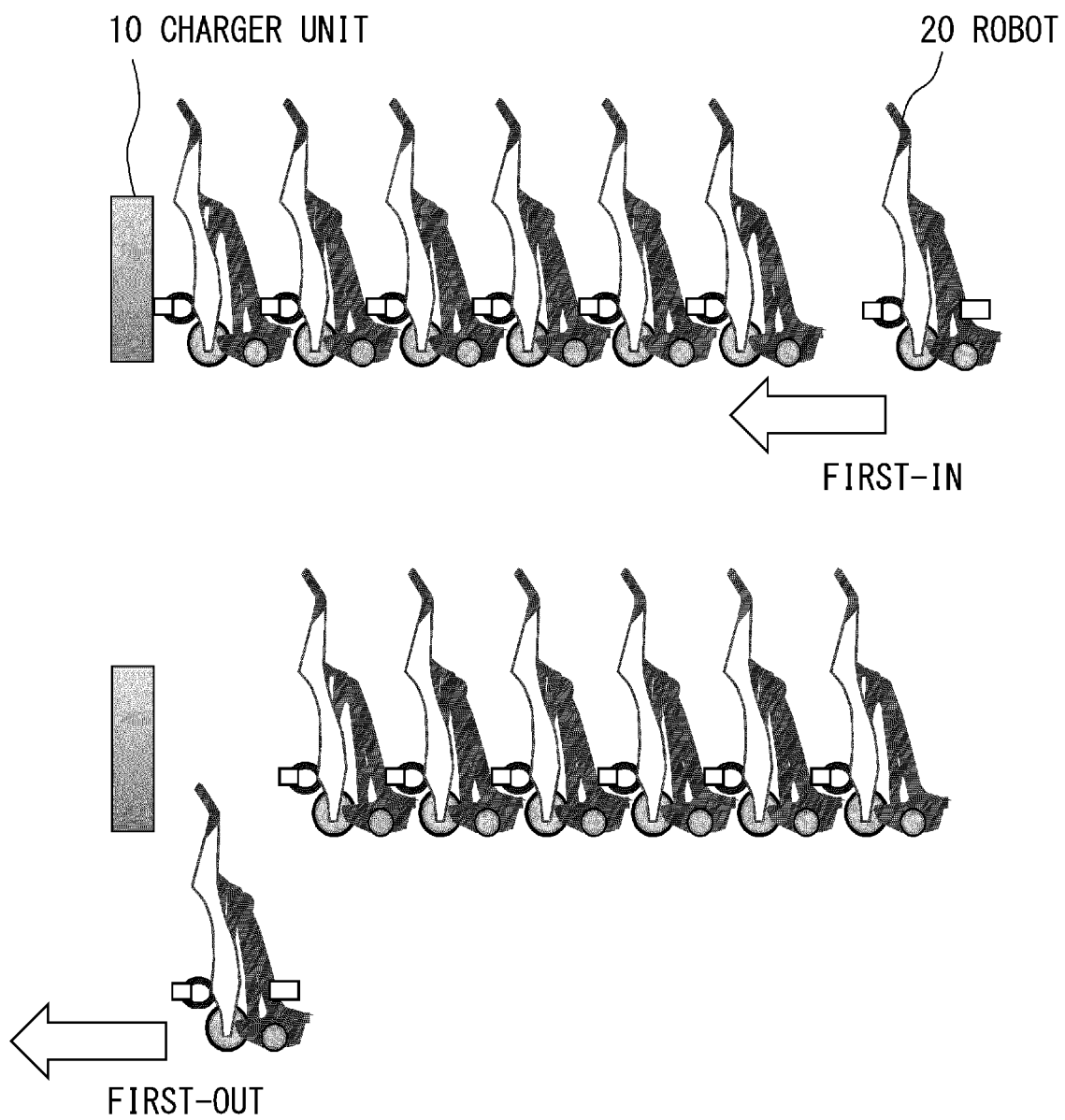
FIG. 8 is a diagram showing an image of a first-in first-out system.
Figure 9:
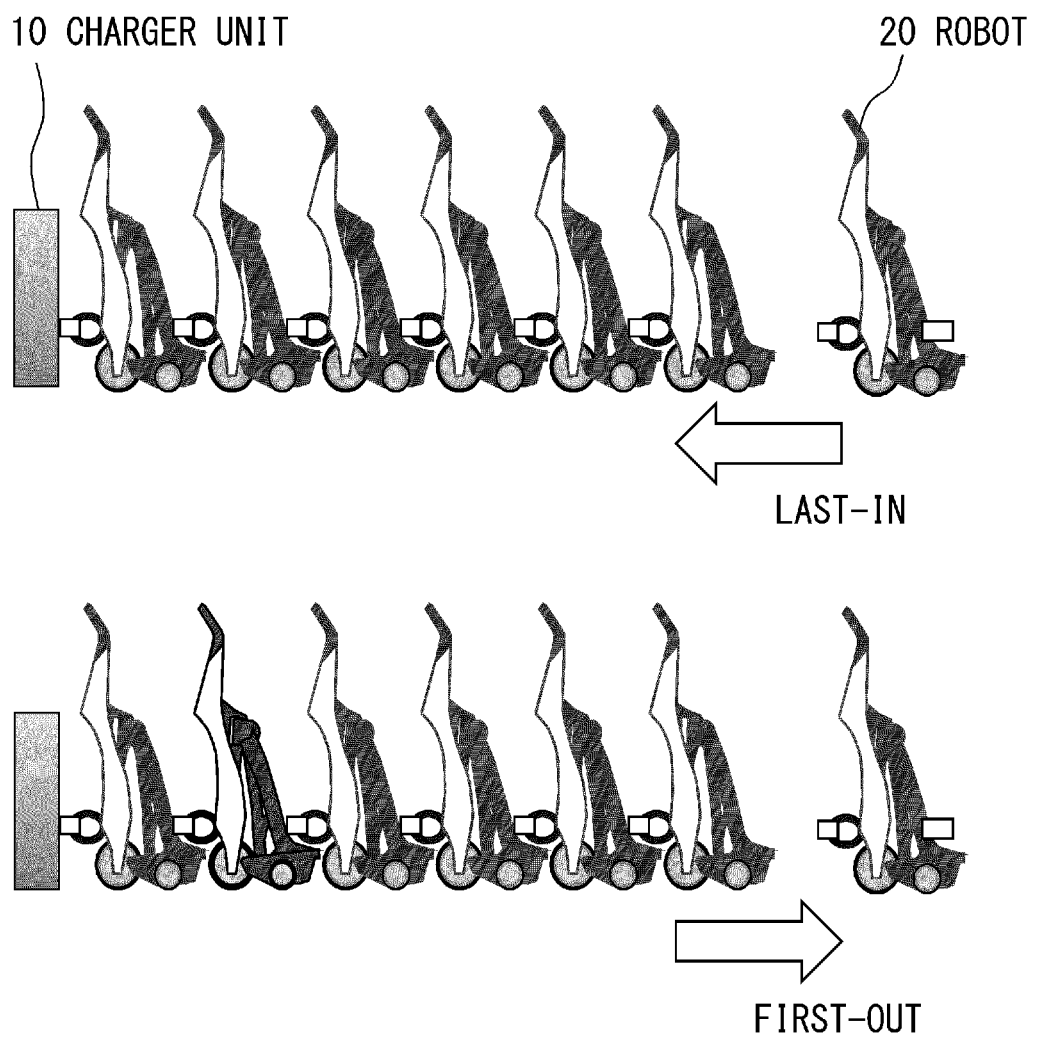
FIG. 9 is a diagram showing an image of a last-in first-out system.

As systems for using the robot 20 in the form of the sharing, two systems, that is, a system in which the robot 20 that has been returned first and is being parked is released and used first (hereinafter this system is called a first-in first-out system) and a system in which the robot 20 that has been returned later and is being parked is released and used first (hereinafter this system is called a last-in first-out system), may be employed. FIG. 8 shows an image view of the first-in first-out system and FIG. 9 shows an image view of the last-in first-out system.

In the charging system according to the first embodiment, the operations in the first-in first-out system are different from the operations in the last-in first-out system. Therefore, in the following description, these operations will be separately described.

Figure 10:
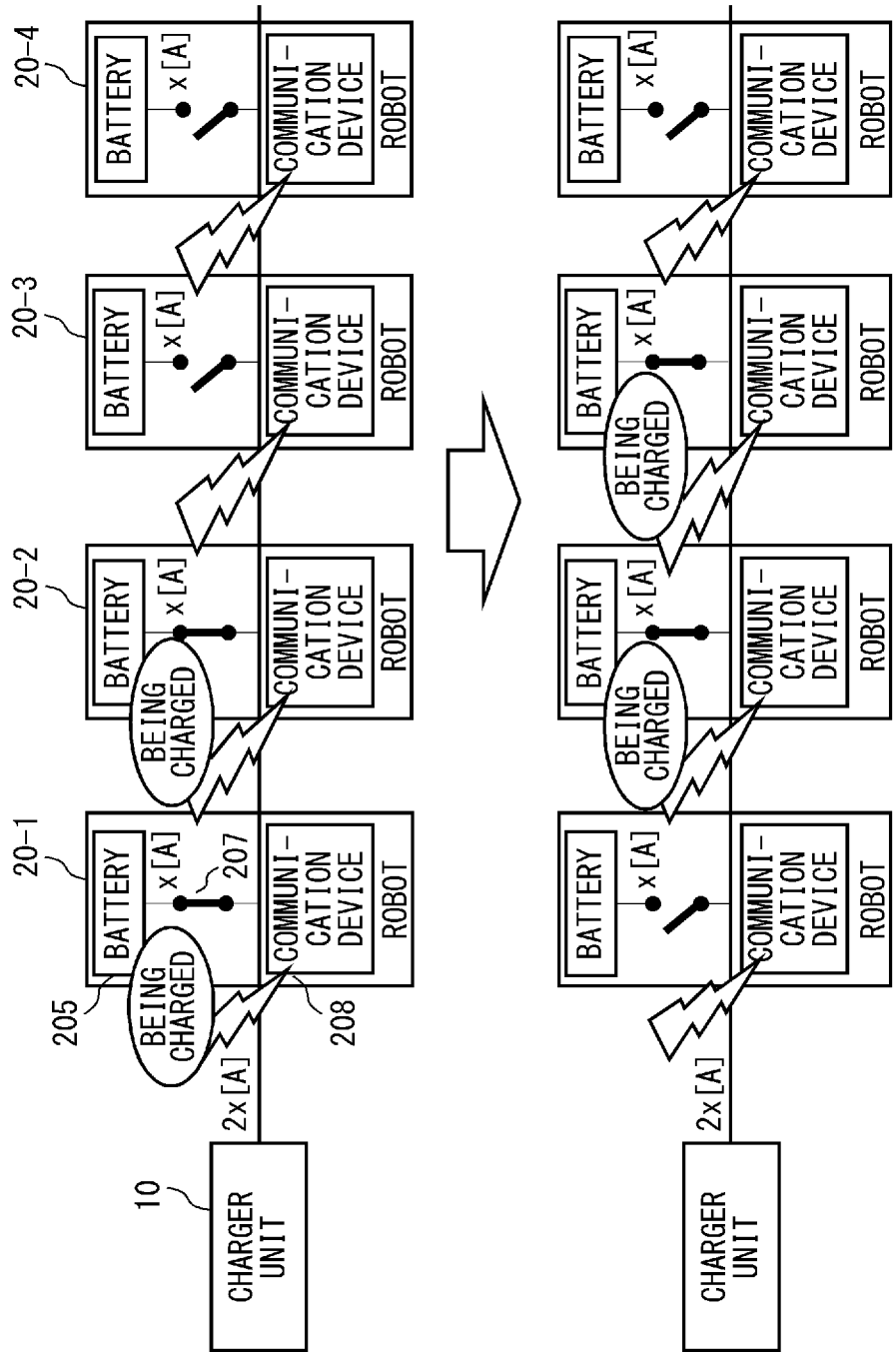
FIG. 10 is a diagram showing one example of schematic operations in the first-in first-out system in the charging system according to the first embodiment.

Schematic Operations in First-in First-Out System According to First Embodiment FIG. 10 shows one example of the schematic operations in the first-in first-out system in the charging system according to the first embodiment. In FIG. 10, parts of the components of the robot 20 shown in FIG. 7 are selectively illustrated.

In FIG. 10, it is assumed that robots 20-1 to 20-4 are connected to the charger unit 10 in this order and the robots 20-1 to 20-4 recognize the connection numbers indicating the order in which they are connected to the charger unit 10. It is further assumed that the allowable current of the charger unit 10 and the power supply line is 2x[A] and the maximum charging current of the battery 205 is x[A].

In order to lend the robot 20 having a sufficient amount of charge to the user, it is useful to maximize the amount of charge in the robot 20 that is released and used first. Therefore, in the first-in first-out system, the battery 205 of the robot 20 that is parked first and is the closest to the charger unit 10 is preferentially charged.

Further, the number of robots 20 that are being charged is controlled in such a way that the total charging current of the batteries 205 of the robots 20 that are being charged does not exceed the allowable current of the charger unit 10 and the power supply line. In FIG. 10, the allowable current of the charger unit 10 and the power supply line is 2x[A], and the maximum charging current of the battery 205 is x[A]. Therefore, charging is performed on the batteries 205 of the two robots 20.

In FIG. 10, the robots 20-1 to 20-4 send the respective connection numbers and the charging state information of the respective robots 20 to the other robots 20 via the communication devices 208.

In this example, the two robots 20 that are parked first are the robots 20-1 and 20-2 whose connection numbers are "1" and "2". Therefore, the two robots 20-1 and 20-2 turn on the charging switches 207 and charge the batteries 205.

Therefore, the robots 20-1 and 20-2 send the respective connection numbers and the charging state information indicating that they are being charged and the remaining charge amounts to the other robots 20 via the communication devices 208. On the other hand, the robots 20-3 and 20-4 send the respective connection numbers and the charging state information indicating that they are not being charged and the remaining charge amounts to the other robots 20 via the communication devices 208.

After that, when the battery 205 of the robot 20-1 is fully charged, the robot 20-1 turns off the charging switch 207, and the charging of the battery 205 is completed. Then the robot 20-1 sends the connection number "1" and the charging state information indicating that the battery 205 is not being charged and is in the fully-charged state to the other robots 20-2 to 20-4 via the communication devices 208.

At this time, the robots 20-2 to 20-4 recognize, based on the charging state information of the respective robots 20-1 to 20-4, that the remaining charge amounts in the robots 20-2 to 20-4 are not the fully-charged level. Further, the robots 20-2 to 20-4 recognize, based on the connection numbers of the respective robots 20-1 to 20-4, that the two robots 20 that are parked first among the robots 20-2 to 20-4 are the robots 20-2 and 20-3 whose connection numbers are "2" and "3". Therefore, the robot 20-2 continues to charge the battery 205 and the robot 20-3 turns on the charging switch 207, thereby starting charging the battery 205. Then the robot 20-3 sends the connection number "3" and the charging state information indicating that it is being charged and the remaining charge amount to the other robots 20-1, 20-2, and 20-4 via the communication devices 208.

Figure 11:
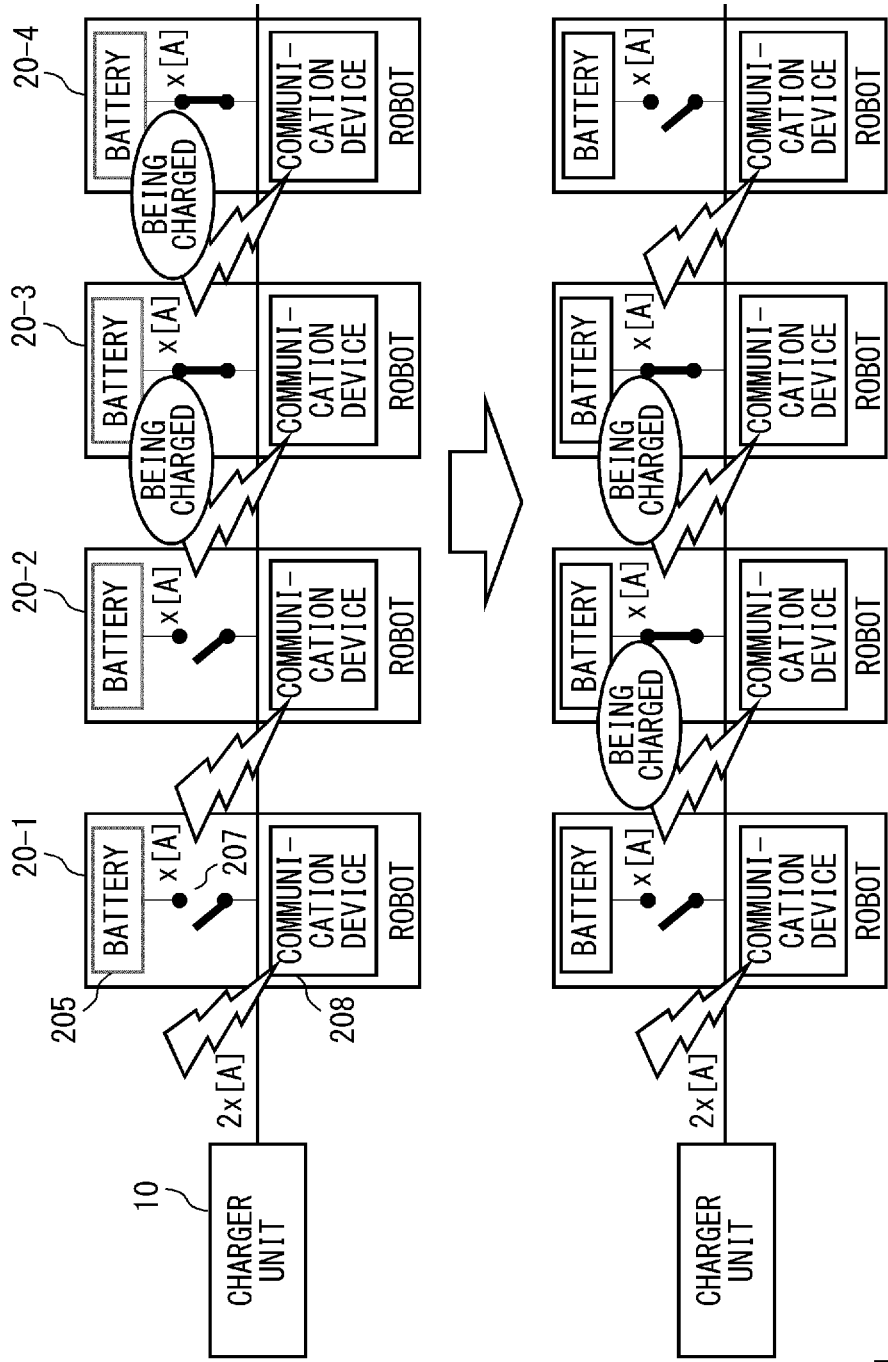
FIG. 11 is a diagram showing one example of schematic operations in the last-in first-out system in the charging system according to the first embodiment.

Schematic Operations in Case of Last-in First-Out System According to First Embodiment FIG. 11 shows one example of schematic operations in the last-in first-out system in the charging system according to the first embodiment. In FIG. 11, parts of the components of the robot 20 shown in FIG. 7 are selectively illustrated.

In FIG. 11, it is assumed that the robots 20-1 to 20-4 are connected to the charger unit 10 in this order and the robots 20-1 to 20-4 recognize the connection numbers indicating the order in which they are connected to the charger unit 10. It is further assumed that the allowable current of the charger unit 10 and the power supply line is 2x[A] and the maximum charging current of the battery 205 is x[A].

In order to lend the robot 20 having a sufficient amount of charge to the user, it is useful to maximize the amount of charge in the robot 20 that is released and used first. Therefore, in the last-in first-out system, the battery 205 of the robot 20 that is parked later and is the farthest from the charger unit 10 is preferentially charged.

Further, the number of robots 20 that are being charged is controlled in such a way that the total charging current of the batteries 205 of the robots 20 that are being charged does not exceed the allowable current of the charger unit 10 and the power supply line. In FIG. 11, the allowable current of the charger unit 10 and the power supply line is 2x[A] and the maximum charging current of the battery 205 is x[A]. Therefore, charging is performed on the batteries 205 of the two robots 20.

In FIG. 11, the robots 20-1 to 20-4 send the respective connection numbers and the charging state information of the respective robots 20 to the other robots 20 via the communication devices 208.

In this example, the two robots 20 that are parked later are the robots 20-3 and 20-4 whose connection numbers are "3" and "4". Therefore, first, the two robots 20-3 and 20-4 turn on the charging switches 207, whereby the batteries 205 are charged.

Therefore, the robots 20-3 and 20-4 send the respective connection numbers and the charging state information indicating that they are being charged and the remaining charge amounts to the other robots 20 via the communication devices 208. On the other hand, the robots 20-1 and 20-2 send the respective connection numbers and the charging state information indicating that they are not being charged and the remaining charge amounts to the other robots 20 via the communication devices 208.

After that, when the battery 205 of the robot 20-4 is fully charged, the robot 20-4 turns off the charging switch 207, and the charging of the battery 205 is completed. Then the robot 20-4 sends the connection number "4" and the charging state information indicating that the battery 205 is not being charged and is in the fully-charged state to the other robots 20-1 to 20-3 via the communication devices 208.

At this time, the robots 20-1 to 20-3 recognize, based on the charging state information of the respective robots 20-1 to 20-4, that the remaining charge amounts in the robots 20-1 to 20-3 are not the fully-charged level. Further, the robots 20-1 to 20-3 recognize, based on the connection numbers of the respective robots 20-1 to 20-4, that the two robots 20 that are parked later among the robots 20-1 to 20-3 are the robots 20-2 and 20-3 whose connection numbers are "2" and "3". Therefore, the robot 20-3 continues to charge the battery 205 and the robot 20-2 turns on the charging switch 207, thereby starting charging the battery 205. Then the robot 20-2 sends the connection number "2" and the charging state information indicating that it is being charged and the remaining charge amount to the other robots 20-1, 20-3, and 20-4 via the communication devices 208.

Operation Flow of Robot According to First Embodiment

Next, an operation flow of the robot 20 according to the first embodiment will be explained.

Figure 12:
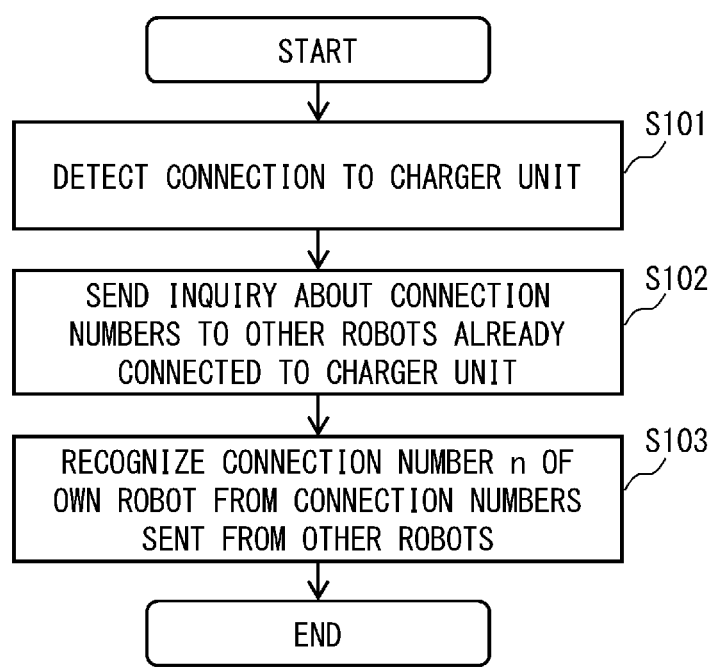
FIG. 12 is a flowchart showing one example of an operation flow when the robot is connected to the charger unit in the robot according to the first embodiment.

FIG. 12 shows one example of an operation flow when the robot 20 is connected to the charger unit 10 in the robot 20 according to the first embodiment.

As shown in FIG. 12, when the robot 20 detects that it has been electrically connected to the charger unit 10 (Step S101), the robot 20 sends an inquiry about the connection numbers to the other robots 20 that have already been electrically connected to the charger unit 10 (Step S102).

Then the robot 20 recognizes the connection number n of itself based on the connection numbers sent from the other robots 20 (Step S103).

Figure 13:
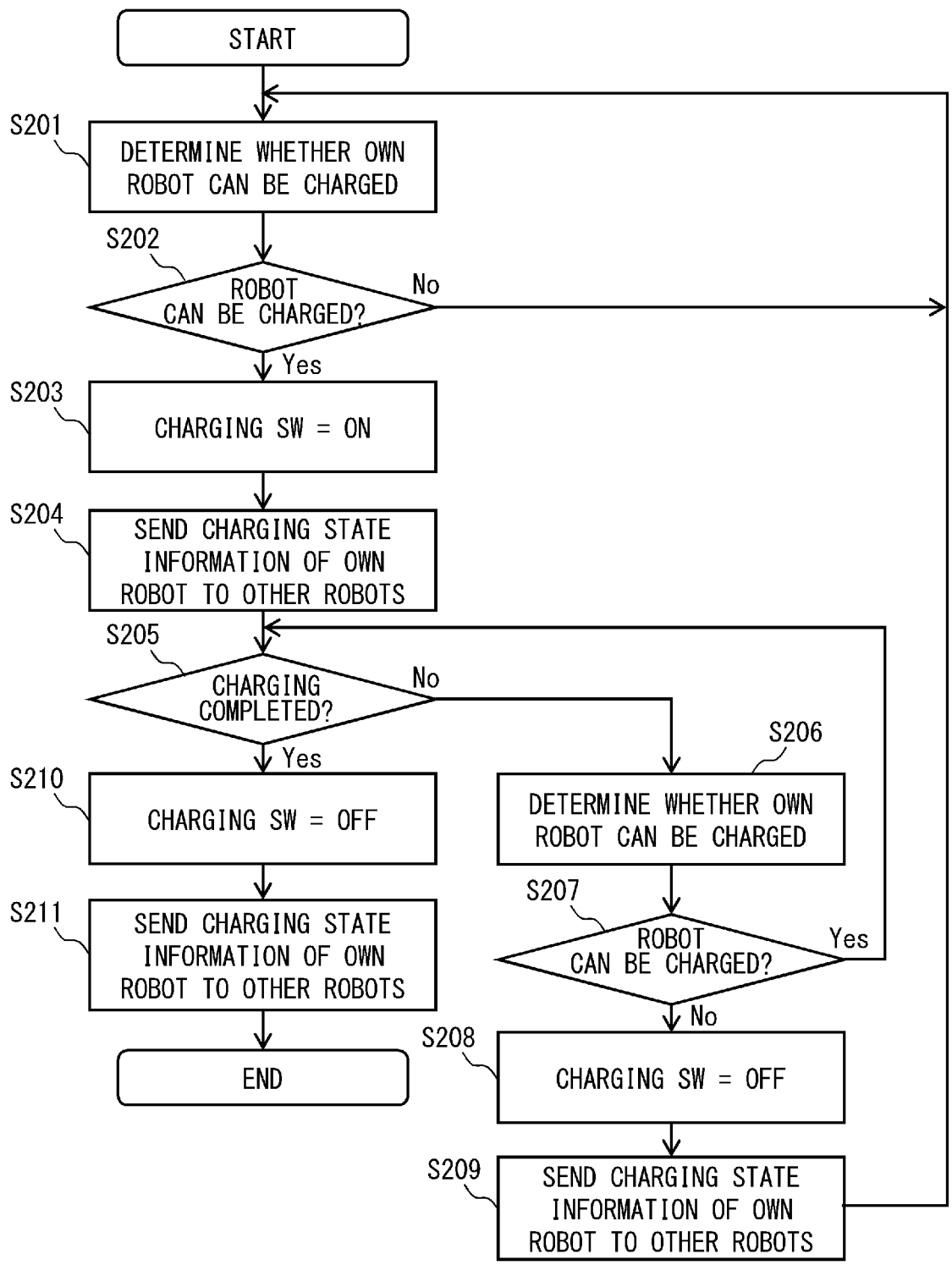
FIG. 13 is a flowchart showing one example of an operation flow when the robot is charged in the robot according to the first embodiment.

FIG. 13 shows one example of an operation flow when the robot 20 is charged in the robot according to the first embodiment.

As shown in FIG. 13, the robots 20 send the respective connection numbers and the charging state information of themselves. Therefore, the robot 20 determines, based on the respective connection numbers and the charging state information of themselves, whether the battery 205 of this robot 20 can be charged (Step. S201).

In Step S201, it is assumed, for example, that the number at which the total charging current of the batteries 205 of the robots 20 that are being charged does not exceed the allowable current of the charger unit 10 and the power supply line is y. In this case, in the first-in first-out system, the robot 20 determines that it can be charged if it is within the y-th from the top among the robots 20 where an abnormality such as interruption of communication has not occurred and whose remaining charge amounts are not the fully-charged level. Further, in the last-in first-out system, the robot 20 determines that it can be charged if it is within the y-th from the last among the robots 20 where an abnormality such as interruption of communication has not occurred and whose remaining charge amounts are not the fully-charged level.

When the result of the determination in Step S201 indicates that the robot 20 cannot be charged (No in Step S202), the process goes back to Step S201.

On the other hand, when the result of the determination in Step S201 indicates that the robot 20 can be charged (Yes in Step S202), then the robot 20 turns on the charging switch 207, thereby starting charging the battery 205 (Step S203). Then the robot 20 sends the connection number and the charging state information indicating that it is being charged and the remaining charge amount to the other robots 20 (Step S204).

Next, the robot 20 determines whether the charging in the battery 205 has been completed (Step S205). When it is determined in Step S205 that the charging has been completed (Yes in Step S205), the process goes to Step S210.

On the other hand, when it is determined in Step S205 that the charging has not been completed (No in Step S205), the robot 20 determines, based on the connection numbers of the respective robots 20 and the charging state information, whether the battery 205 of this robot 20 can be charged again (Step S206). This, is because, since the robot 20 that is parked later is preferentially charged in the last-in first-out system, it is possible that the robot 20 that has already been charged may stop charging the battery. The determination method in Step S206 is similar to the method described in Step S201.

When the result of the determination in Step S206 indicates that the battery 205 of this robot 20 can be charged (Yes in Step S207), the process goes back to Step S205.

On the other hand, when the result of the determination in Step S206 indicates that the battery 205 of this robot 20 cannot be charged (No in Step S207), the robot 20 turns off the charging, switch 207, and stops charging the battery 205 (Step S208). Then the robot 20 sends the connection number and the charging state information indicating that it not being charged and the remaining charge amount to the other robots 20 (Step S209). After that, the process goes back to Step S201.

When it is determined in Step S205 that the charging has been completed (Yes in Step S205), the robot 20 turns off the charging switch 207 (Step S210). Then the robot 20 sends the connection number and the charging state information indicating that it not being charged and the remaining charge amount to the other robots 20 (Step S211). After that, the processing is ended.

Figure 14:
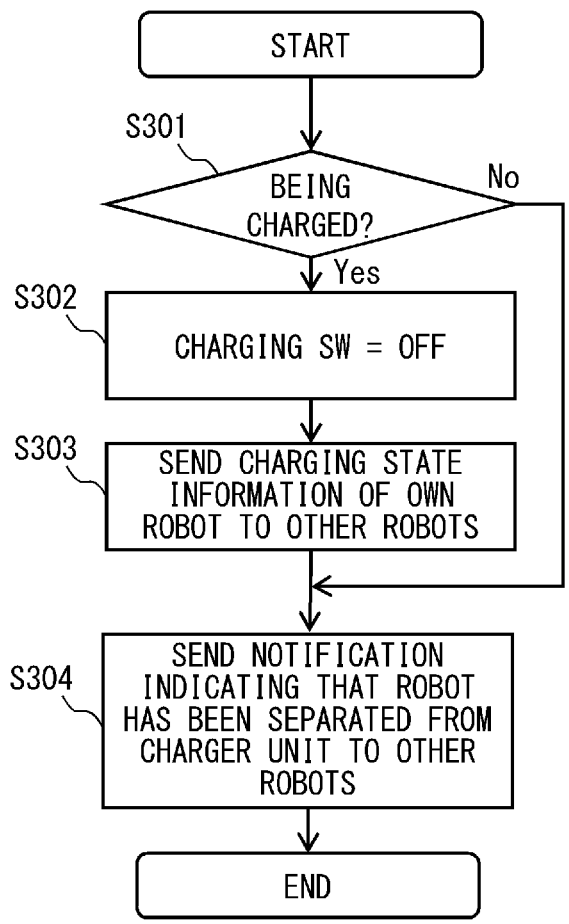
FIG. 14 is a flowchart showing one example of an operation, flow when the robot is separated from the charger unit in the robot according to the first embodiment.

FIG. 14 shows one example of an operation flow when the robot 20 is separated from the charger unit 10 in the robot 20 according to the first embodiment.

As shown in FIG. 14, the robot 20 determines whether it is being charged (Step S301). When it is determined in Step S301 that it is not being charged (No in Step S301), the process goes to Step S304.

On the other hand, when it is determined in Step S301 that the robot 20 is being charged (Yes in Step S301), the robot 20 turns off the charging switch 207 (Step S302), and sends the connection number and the charging state information indicating that it not being charged and the remaining charge amount to the other robots 20 (Step S303).

Next, the robot 20 sends the connection number and a notification indicating that it has been separated from the charger unit 10 to the other robots 20 (Step S304). After that, the processing is ended.

Effects of First Embodiment

As described above, according to the first embodiment, each of the robots 20 sends the charging state information of the battery 205 of this robot 20 to the other robots 20. When the batteries 205 of the plurality of robots 20 are charged, the plurality of robots 20 are aligned in the serial state, the charger unit 10 and the plurality of robots 20 are electrically connected to each other, and power is supplied from the charger unit 10 to the respective robots 20, thereby charging the batteries 205 of the plurality of robots 20 by one charger unit 10. At this time, each of the robots 20 executes control for switching the charging state and the non-charging state of the batteries 205 of the respective robots 20 in such a way that the total charging current that flows through the batteries 205 of the respective robots 20 does not exceed the allowable current of the charger unit 10 and the power supply line based on the charging state information of the batteries 205 of the respective robots 20.

Therefore, when the plurality of robots 20 are aligned in the serial state and the batteries 205 of the plurality of robots 20 are charged by one charger unit 10, the batteries 205 of the respective robots 20 can be charged safely within the range of the allowable current of the charger unit 10 and the power supply line.

Further, according to the first embodiment, in the first-in first-out system, the robot 20 that is parked first and is the closest to the charger unit 10 is preferentially charged in such a way that the total charging current that flows through the batteries 205 of the respective robots 20 does not exceed the allowable current of the charger unit 10 and the power supply line. Further, in the last-in first-out system, the robot 20 that is parked later and is the farthest from the charger unit 10 is preferentially charged in such a way that the total charging current that flows through the batteries 205 of the respective robots 20 does not exceed the allowable current of the charger unit 10 and the power supply line.

Therefore, when the robot 20 connected to the charger unit 10 first is preferentially separated from the charger unit 10 and used or when the robot 20 connected to the charger unit 10 later is preferentially separated from the charger unit 10 and used, the battery 205 of the robot 20 that should be charged can be preferentially charged.

While the control is performed in such a way that the amount of the current that flows through the charger unit 10 and the power supply line does not exceed the allowable current by adjusting the number of robots 20 to be charged in the first embodiment, this embodiment is not limited thereto.

In general, the charging current when the battery 205 is charged is the highest just after the charging is started and becomes stable at a low current value when charging proceeds. Therefore, when the number of robots 20 in which charging has proceeded is large, the charging current in these robots 20 becomes low. Therefore, the number of robots 20 that can be charged can be further increased.

Accordingly, for example, each of the robots 20 is able to control charging finely such as sending the charging current when the battery 205 is charged to the other robots 20 or adjusting the number of robots 20 to be charged in accordance with the charging current.

(2) Second Embodiment

In the first embodiment, each of the robots 20 serves as a controller and executes control for switching the charging state and the non-charging state of the batteries 205 of the respective robots 20 in such a way that the total charging current that flows through the batteries 205 of the respective robots 20 does not exceed the allowable current of the charger unit 10 and the power supply line.

On the other hand, in the second embodiment, the charger unit 10 serves as a controller and executes control for switching the charging state and the non-charging state of the batteries 205 of the respective robots 20 in such a way that the total charging current that flows through the batteries 205 of the respective robots 20 does not exceed the allowable current of the charger unit 10 and the power supply line.

Configuration of Second Embodiment

In the second embodiment, the block configuration of the charger unit 10 is different from that of the first embodiment and external configurations of the charger unit 10 and the robot 20 and the block configuration of the robot 20 are similar to those of the first embodiment.

Therefore, in the following description, only the block configuration of the charger unit 10 according to the second embodiment will be explained as the configuration of the second embodiment. In this example, the block configuration in which the charger unit 10 includes the charging connector 101 and the robot 20 includes the forward charging connector 201 and the backward charging connector 202 will be explained.

Block Configuration of Charger Unit According to Second Embodiment

Figure 15:
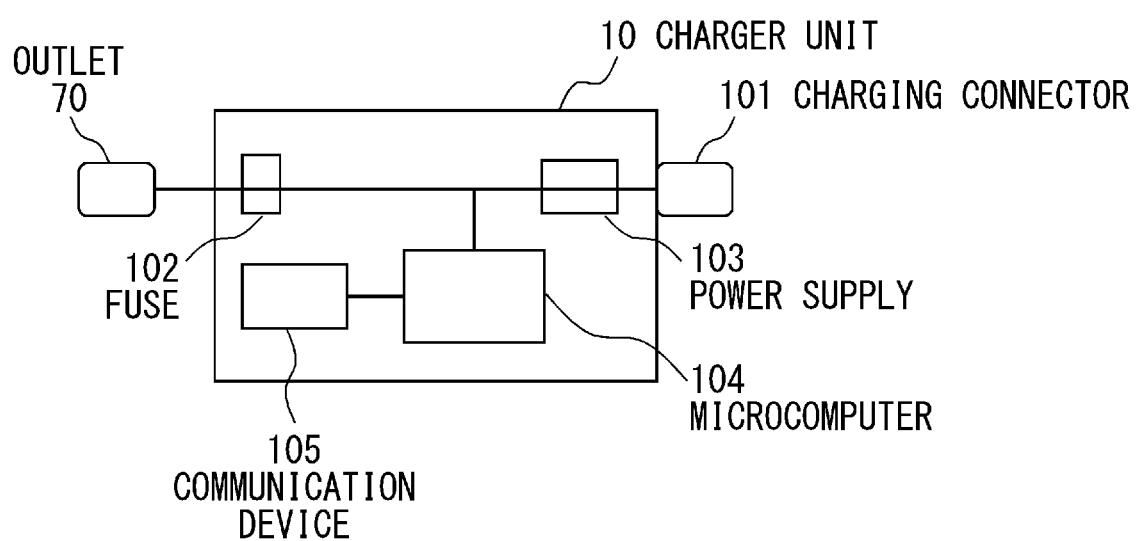
FIG. 15 is a block diagram showing one example of a block configuration of a charger unit according to a second embodiment.

FIG. 15 shows one example of the block configuration of the charger unit 10 according to the second embodiment.

The charger unit 10 shown in FIG. 15 is different from that of the first embodiment shown in FIG. 6 in that a microcomputer 104 and a communication device 105 are added.

The communication device 105 performs communication with an external device. In the second embodiment, the communication device 105 performs, communication with the robot 20. While the communication system of the communication device 105 may be, for example, radio communication (e.g., wireless LAN communication, Bluetooth (registered trademark) communication), wired serial communication, or power communication, it is not particularly limited thereto.

The microcomputer 104 controls each of the components inside the charger unit 10 and executes the functions included in the charger unit 10.

In the second embodiment, the microcomputer 104 receives charging state information of the batteries 205 of the respective robots 20 from the respective robots 20 via the communication devices 105.

When the microcomputer 104 charges the batteries 205 of the respective robots 20, the microcomputer 104 executes control for switching the charging state and the non-charging state of the batteries 205 of the respective robots 20 in such a way that the total charging current that flows through the batteries 205 of the respective robots 20 does not exceed the allowable current of the charger unit 10 and the power supply line based on the charging state information of the batteries 205 of the respective robots 20. Therefore, in the second embodiment, the microcomputer 104 of the charger unit 10 serves as a controller.

The microcomputer 104 sends a charging instruction to the robot 20 whose battery 205 will be charged via the communication device 105. On the other hand, the microcomputer 104 sends a charging stop instruction to the robot 20 whose battery 205 will not be charged via the communication device 105.

Operations of Second Embodiment

Next, operations in the charging system according to the second embodiment will be explained.

In the following description, similar to the first embodiment, operations in the first-in first-out system and operations in the last-in first-out system will be separately described.

Schematic Operations in First-in First-Out System in Second Embodiment

Figure 16:
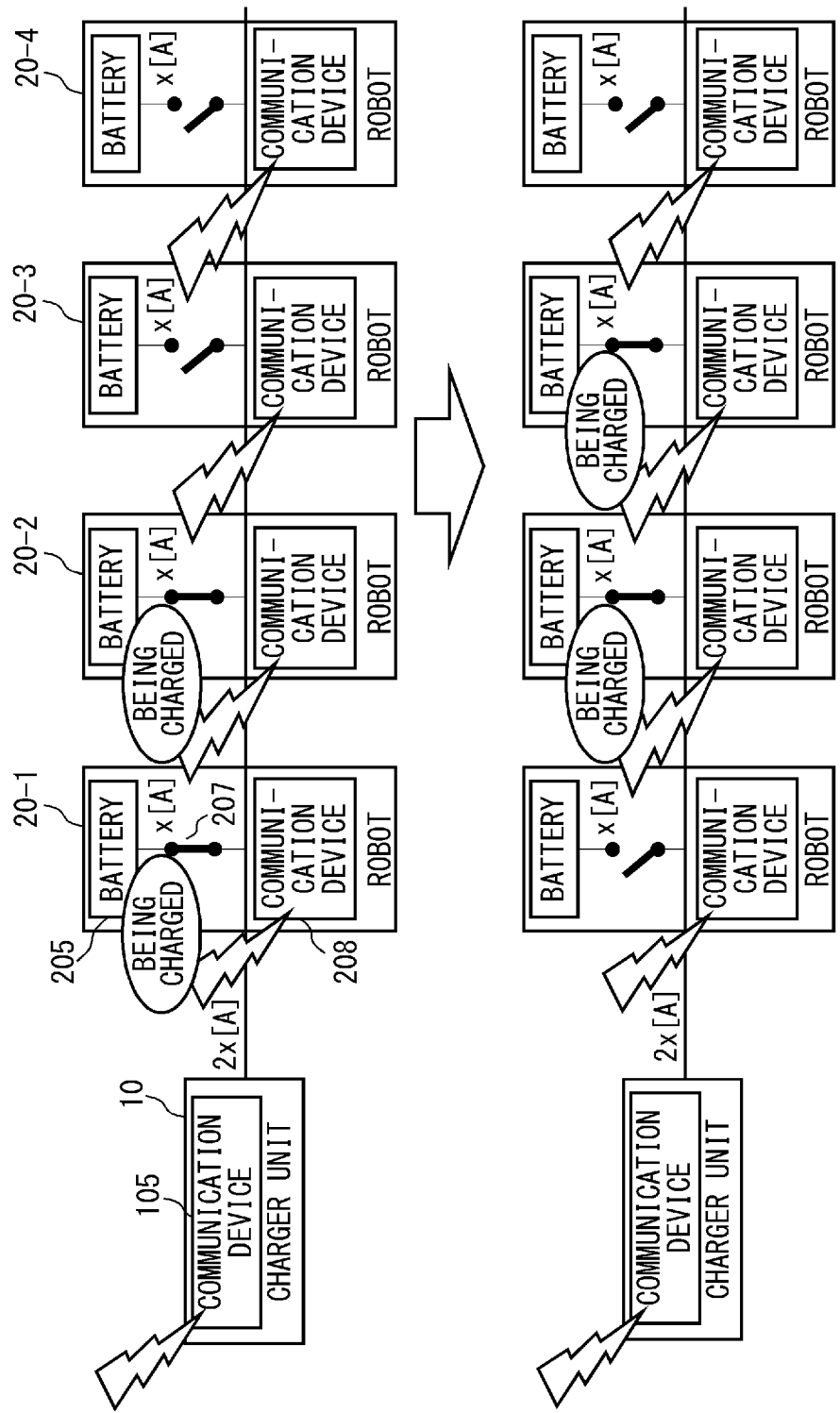
FIG. 16 is a diagram showing, one example of schematic operations in the first-in first-out system in a charging system according to the second embodiment.

FIG. 16 shows one example of schematic operations in the first-in first-out system in the charging system according to the second embodiment. In FIG. 16, parts of the components of the robot 20 shown in FIG. 7 and the components of the charger unit 10 shown in FIG. 15 are selectively illustrated.

In FIG. 16, it is assumed that the robots 20-1 to 20-4 are connected to the charger unit 10 in this order and the robots 20-1 to 20-4 recognize, the connection numbers indicating the order in which they are connected to the charger unit 10. It is further assumed that the charger unit 10 recognizes the connection numbers of the respective robots 20-1 to 20-4. It is further assumed that the allowable current of the charger unit 10 and the power supply line is 2x[A] and the maximum charging current of the battery 205 is x[A].

In order to lend the robot 20 having a sufficient amount of charge to the user, it is useful to maximize the amount of charge in the robot 20 that is released and used first. Therefore, in the first-in first-out system, the battery 205 of the robot 20 that is parked first and is the closest to the charger unit 10 is preferentially charged.

Further, the number of robots 20 that are being charged is controlled in such a way that the total charging current of the batteries 205 of the robots 20 that are being charged does not exceed the allowable current of the charger unit 10 and the power supply line. In FIG. 16, the allowable current of the charger unit 10 and the power supply line is 2x[A], and the maximum charging current of the battery 205 is x[A]. Therefore, charging is performed on the batteries 205 of the two robots 20.

In FIG. 16, the robots 20-1 to 20-4 send the respective connection numbers and the charging state information of the respective robots 20 to the charger unit 10 via the communication devices 208.

In this example, the two robots 20 that are parked first are the robots 20-1 and 20-2 whose connection numbers are "1" and "2". Therefore, first, the charger unit 10 sends the charging instruction to the two robots 20-1 and 20-2 via the communication devices 105 and the two robots 20-1 and 20-2 turn on the charging switches 207, whereby the batteries 205 are charged. On the other hand, the charger unit 10 sends the charging stop instruction to the two robots 20-3 and 20-4 via the communication devices 105, and the two robots 20-3 and 20-4 turn off the charging switches 207 and stop charging the batteries 205, Therefore, the robots 20-1 and 20-2 send the respective connection numbers and the charging state information indicating that they are being charged and the remaining charge amounts to the charger unit 10 via the communication devices 208. On the other hand, the robots 20-3 and 20-4 send the respective connection numbers and the charging state information indicating that they are not being charged and the remaining charge amounts to the charger unit 10 via the communication devices 208.

After that, when the battery 205 of the robot 20-1 is fully charged, the robot 20-1 turns off the charging switch 207, and the charging of the battery 205 is completed. Then the robot 20-1 sends the connection number "1" and the charging state information indicating that the battery 205 is not being charged and is in the fully-charged state to the charger unit 10 via the communication device 208.

At this time, the charger unit 10 recognizes, based on the charging state information of the respective robots 20-1 to 20-4, that the remaining charge amounts in the robots 20-2 to 20-4 are not the fully-charged level. The charger unit 10 further recognizes, based on the connection numbers of the respective robots 20-1 to 20-4, that the two robots 20 that are parked first among the robots 20-2 to 20-4 are the robots 20-2 and 20-3 whose connection numbers are "2" and "3". Therefore, the charger unit 10 does not send the charging instruction again to the robot 20-2 and causes the robot 20-2 to continue to charge the battery 205. Further, the charger unit 10 sends the charging instruction to the robot 20-3 via the communication device 105 and the robot 20-3 turns on the charging switch 207, thereby starting charging the battery 205. Then the robot 20-3 sends the connection number "3" and the charging state information indicating that it is being charged and the remaining charge amount to the charger unit 10 via the communication device 208. When the charger unit 10 sends the charging instruction to the robot 20-3, the charger unit 10 may send the charging instruction or the charging stop instruction to all the robots 20-1 to 20-4 again.

Schematic Operations in Last-in First-Out System According to Second Embodiment

Figure 17:
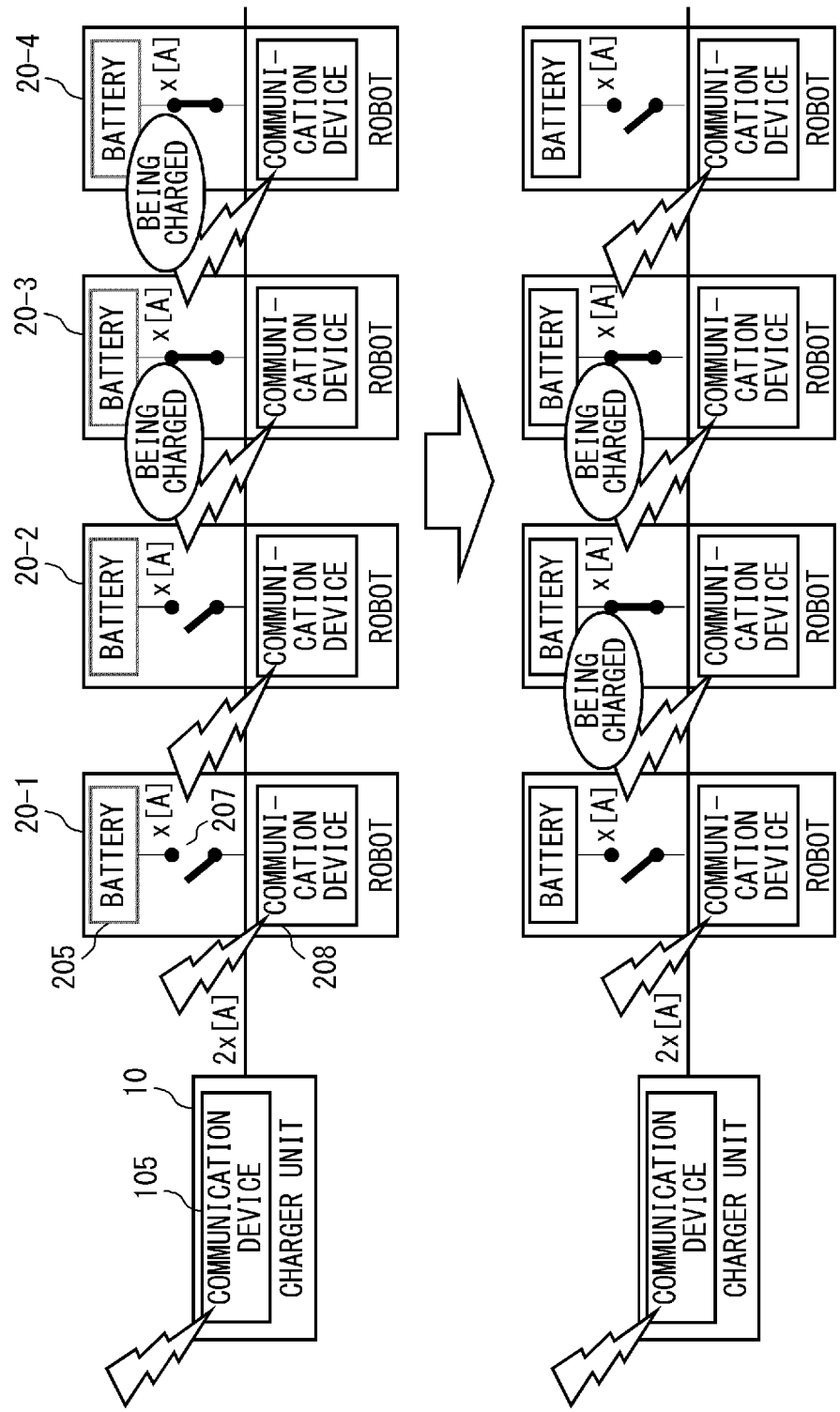
FIG. 17 is a diagram showing one example of schematic operations in the last-in first-out system in the charging system according to the second embodiment.

FIG. 17 shows one example of schematic operations in the last-in first-out system in the charging system according to the second embodiment. In FIG. 17, parts of the components of the robot 20 shown in FIG. 7 and the components of the charger unit 10 shown in FIG. 15 are selectively illustrated.

In FIG. 17, it is assumed that the robots 20-1 to 20-4 are connected to the charger unit 10 in this order and the robots 20-1 to 20-4 recognize the connection numbers indicating the order in which they are connected to the charger unit 10. It is further assumed that the charger unit 10 recognizes the connection numbers of the respective robots 20-1 to 20-4. It is further assumed that the allowable current of the charger unit 10 and the power supply line is 2x[A] and the maximum charging current of the battery 205 is x[A].

In order to lend the robot 20 having a sufficient amount of charge to the user, it is useful to maximize the amount of charge in the robot 20 that is released and used first. Therefore, in the last-in first-out system, the battery 205 of the robot 20 that is parked later and is the farthest from the charger unit 10 is preferentially charged.

Further, the number of robots 20 that are being charged is controlled in such a way that the total charging current of the batteries 205 of the robots 20 that are being charged does not exceed the allowable current of the charger unit 10 and the power supply line. In FIG. 17, the allowable current of the charger unit 10 and the power supply line is 2x[A] and the maximum charging current of the battery 205 is x[A]. Therefore, charging is performed on the batteries 205 of the two robots 20.

In FIG. 17, the robots 20-1 to 20-4 send the respective connection numbers and the charging state information of the respective robots 20 to the charger unit 10 via the communication devices 208.

In this example, the two robots 20 that are parked later are the robots 20-3 and 20-4 whose connection numbers are "3" and "4". Therefore, first, the charger unit 10 sends the charging instruction to the two robots 20-3 and 20-4 via the communication devices 105 and the two robots 20-3 and 20-4 turn on the charging switches 207, whereby the batteries 205 are charged. On the other hand, the charger unit 10 sends the charging stop instruction to the two robots 20-1 and 20-2 via the communication devices 105, and the two robots 20-1 and 20-2 turn off the charging switches 207 and stop charging the batteries 205.

Therefore, the robots 20-3 and 20-4 send the respective connection, numbers and the charging state information indicating that they are being charged and the remaining charge amounts to the charger unit 10 via the communication devices 208. On the other hand, the robots 20-1 and 20-2 send the respective connection numbers and the charging state information indicating that they are not being charged and the remaining charge amounts to the charger unit 10 via the communication devices 208.

After that, when the battery 205 of the robot 20-4 is fully charged, the robot 20-4 turns off the charging switch 207, and the charging of the battery 205 is completed. Then the robot 20-4 sends the connection number "4" and the charging state information indicating that the battery 205 is not being charged and is in the fully-charged state to the charger unit 10 via the communication device 208.

At this time, the charger unit 10 recognizes, based on the charging state information of the respective robots 20-1 to 20-4, that the remaining charge amounts in the robots 20-1 to 20-3 are not the fully-charged level. The charger unit 10 further recognizes, based on the connection numbers of the respective robots 20-1 to 20-4, that the two robots 20 that are parked later among the robots 20-1 to 20-3 are the robots 20-2 and 20-3 whose connection numbers are "2" and "3". Therefore, the charger unit 10 does not send the charging instruction again to the robot 20-3, and causes the robot 20-3 to continue to charge the battery 205. Further, the charger unit 10 sends the charging instruction to the robot 20-2 via the communication device 105, and the robot 20-2 turns on the charging switch 207, thereby starting charging the battery 205. Then the robot 20-2 sends the connection number "2" and the charging state information indicating that it is being charged and the remaining charge amount to the charger unit 10 via the communication device 208. The charger unit 10 may send the charging instruction or the charging stop instruction to all the robots 20-1 to 20-4 again when it sends the charging instruction to the robot 20-2.

Operation Flow of Charger Unit According to Second Embodiment

Next, an operation flow of the charger unit 10 according to the second embodiment will be explained.

Figure 18:
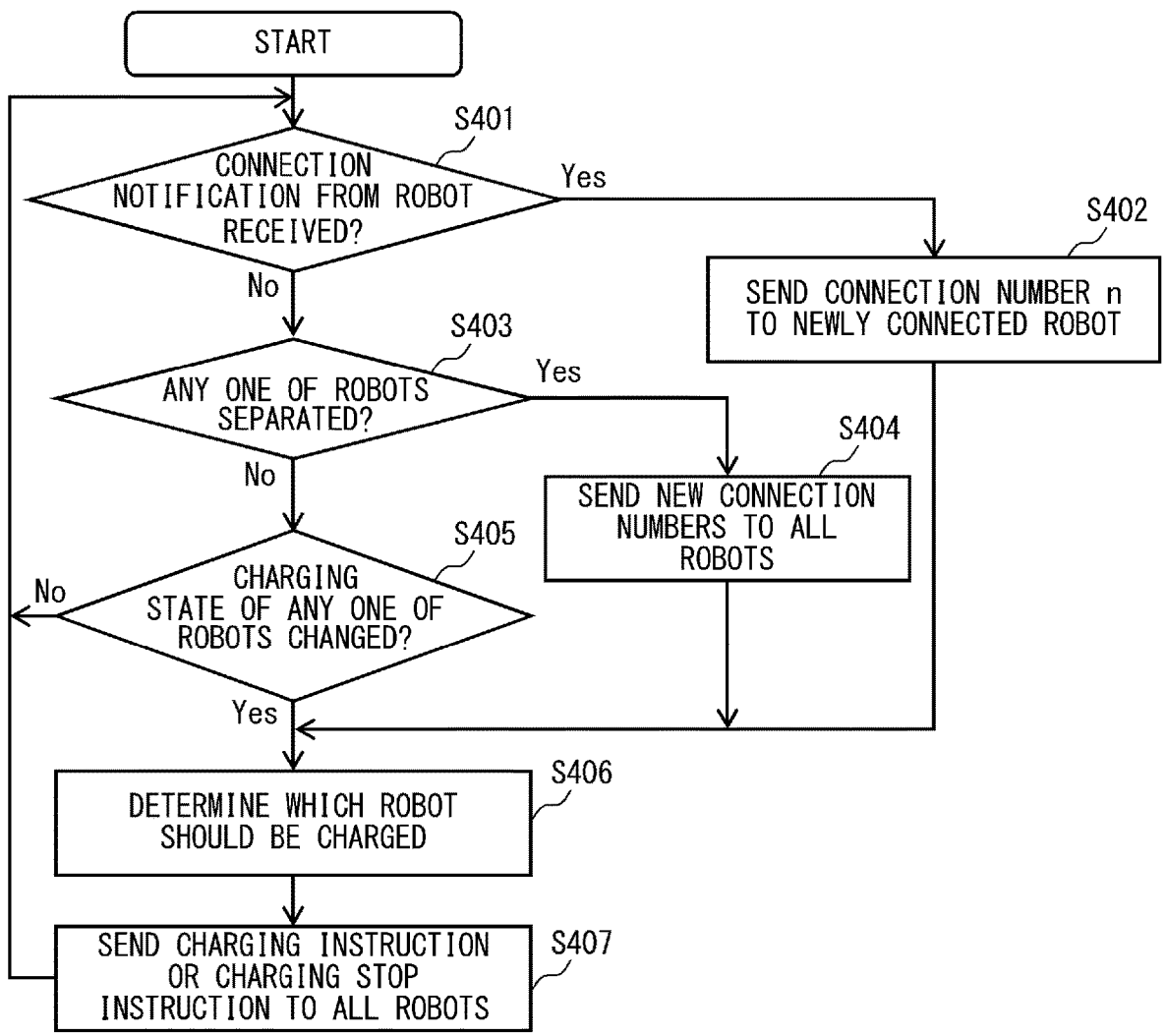
FIG. 18 is a flowchart showing one example of an operation flow in the charger unit according to the second embodiment.

FIG. 18 shows one example of the operation flow of the charger unit 10 according to the second embodiment. In FIG. 18, it is assumed that the robot 20 sends a connection notification to the charger unit 10 upon detecting that it has been electrically connected to the charger unit 10. It is further assumed that the robot 20 sends the connection number and the notification indicating that it has been separated from the charger unit 10 to the charger unit 10 when it is separated from the charger unit 10.

As shown in FIG. 18, the charger unit 10 determines whether it has received the connection notification from the robot 20 (Step S401).

When it is determined in Step S401 that the charger unit 10 has received the connection notification (Yes in Step S401), then the charger unit 10 allocates, based on the connection numbers of the other robots 20 that have already been connected to the charger unit 10, the connection number n to the robot 20 that has been newly connected to the charger unit 10, and sends this connection number n to this robot 20 (Step S402). After that, the process goes to Step S406.

On the other hand, when it is determined in Step S401 that the charger unit 10 has not received the connection notification (No in Step S401), then the charger unit 10 determines whether any one of the robots 20 that have already been connected to the charger unit 10 has been separated from the charger unit 10 (Step S403).

When it is determined in Step S403 that one of the robots 20 has been separated from the charger unit 10 (Yes in Step S403), then the charger unit 10 allocates new connection numbers to all the robots 20 that are connected to the charger unit 10 at this point, and sends this new connection numbers to all the robots 20 (Step S404). After that, the process goes to Step S406.

On the other hand, when it is determined in Step S403 that none of the robots 20 has been separated from the charger unit 10 (No in Step S403), then the charger unit 10 determines whether the charging state of any one of the robots 20 that are connected to the charger unit 10 at this point has been changed (Step S405).

When, for example, the battery 205 of the robot 20 has reached the fully-charged level during the charging or an abnormality such as a situation in which the communication with another robot 20 is interrupted has occurred, the robot 20 turns off the charging switch 207 so that the battery 205 of this robot 20 is no longer being charged. In this case, the robot 20 sends the charging state information indicating that it is not being charged to the charger unit 10 along with the connection number. In this case, the charger unit 10 determines that the charging state of the robot 20 has been changed.

When it is determined in Step S405 that the charging state of any robot 20 has not changed (No in Step S405), the process goes back to Step S401. When the charging state of any one of the robots 20 has been changed (Yes in Step S405), the process goes to Step S406.

When there is a robot 20 that has been newly connected to the charger unit 10 (Yes in Step S401), when there is a robot 20 that has been separated from the charger unit 10 (Yes in Step S403), and when there is a robot 20 whose charging state has been changed (Yes, in Step S405), the charger unit 10 determines, based on the connection number and the charging state information of the robot 20 that is connected to the charger unit 10 at this point, which battery 205 of which robot 20 should be charged (Step S406).

In Step S406, for example, it is assumed that the number of robots 20 at which the total charging current of the batteries 205 of the robots 20 that are being charged does not exceed the allowable current of the charger unit 10 and the power supply line is y. In this case, in the first-in first-out system, the charger unit 10 determines that the batteries 205 of the first to y-th robots 20 when counting from the top will be charged among the robots 20 where an abnormality such as interruption of communication has not occurred and whose remaining charge amounts are not the fully-charged level. In the last-in first-out system, the charger unit 10 determines that the batteries 205 of the last to y-th robots 20 when counting from the last will be charged among the robots 20 where an abnormality such as interruption of communication has not occurred and whose remaining charge amounts are not the fully-charged level.

After that, the charger unit 10 sends the charging instruction to the robot 20 whose battery 205 will be charged, and sends the charging stop instruction to the other robots 20 (Step S407). At this time, the charger unit 10 may send the charging instruction or the charging stop instruction to all the robots 20 that are connected to the charger unit 10 at this point, or may send the charging instruction or the charging stop instruction only to the robot 20 where the content of the instruction has been changed.

Operations when Charger Units 10 of Multiple Systems are Included According to Second Embodiment While the configuration in which the charger unit 10 of one system is included has been described in the second embodiment, this configuration may be changed to a configuration in which charger units 10 of multiple systems are included.

Figure 19:
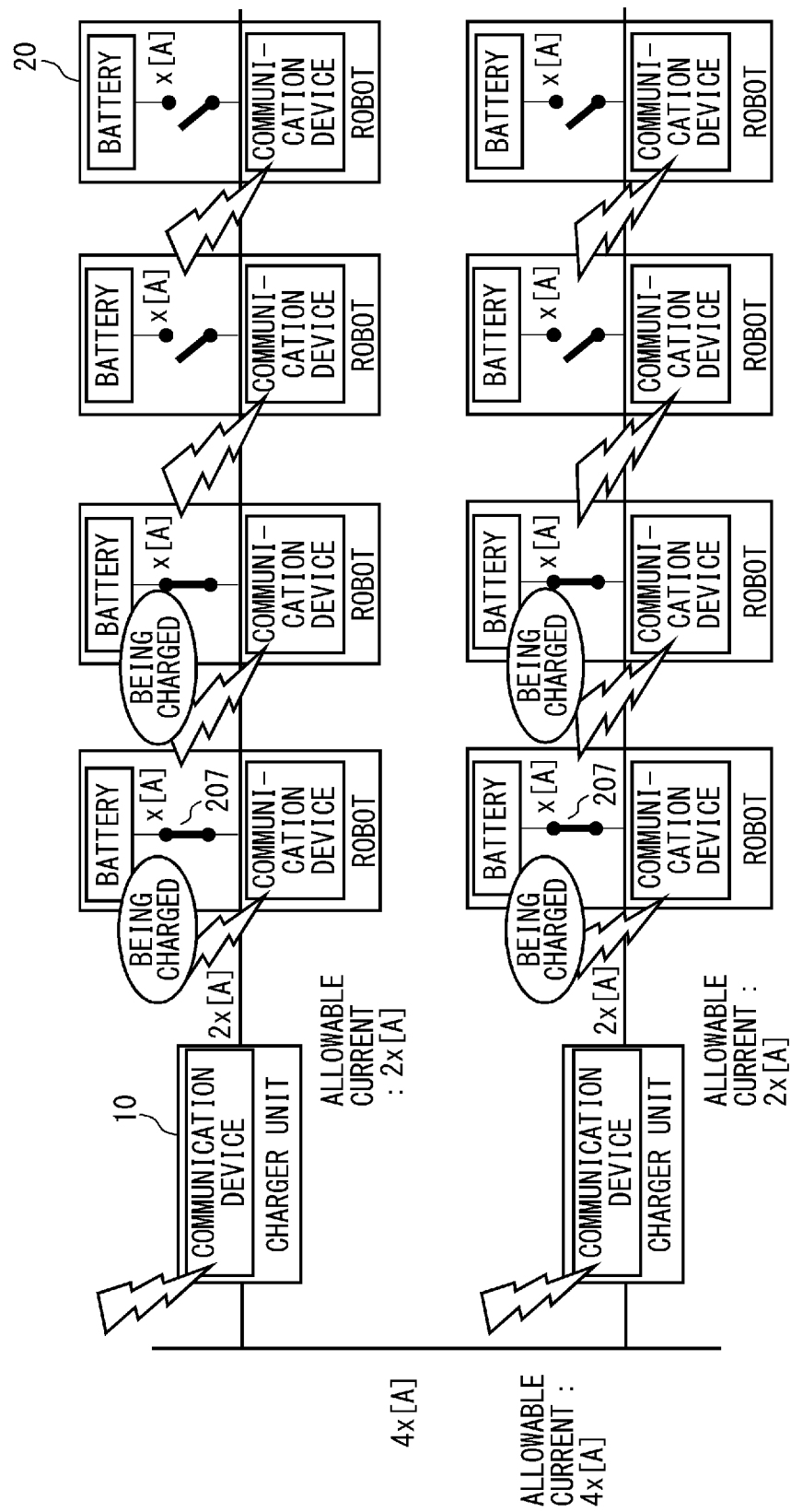
FIG. 19 is a diagram showing one example of schematic operations when charger units of two systems are included in the charging system according to the second embodiment.

FIG. 19 is a diagram showing one example of schematic operations when charger units 10 of two systems are included in the charging system according to the second embodiment.

In FIG. 19, the allowable current of the charging equipment is $4x[A]$, the allowable current of the charger unit 10 and the power supply line is $2x[A]$, and the maximum charging current of the battery 205 is $x[A]$.

Therefore, each of the charger units 10 of the two systems is supplied with the current of $2x[A]$. Then in each of the two systems, the power supply line is supplied with the current of $2x[A]$ and charging is performed on the batteries 205 of the two robots 20.

Accordingly, it is possible to execute control for switching the charging state and the non-charging state of the batteries 205 of the respective robots 20 in such a way that the total charging current that flows through the batteries 205 of the respective robots 20 does not exceed the allowable current of the charger unit 10 and the power supply line while limiting the power to be supplied to the charger unit 10.

Effects of Second Embodiment

As described above, according to the second embodiment, the robots 20 send the charging state information of the batteries 205 of the respective robots 20 to the charger unit 10. When the batteries 205 of the plurality of robots 20 are charged, the plurality of robots 20 are aligned in the serial state, the charger unit 10 and the plurality of robots 20 are electrically connected to each other, power is supplied from the charger unit 10 to the respective robots 20, and the batteries 205 of the plurality of robots 20 are charged by one charger unit 10. At this time, the charger unit 10 executes control for switching the charging state and the non-charging state of the batteries 205 of the respective robots 20 in such a way that the total charging current that flows through the batteries 205 of the respective robots 20 does not exceed the allowable current of the charger unit 10 and the power supply line based on the charging state information of the batteries 205 of the respective robots 20.

Therefore, when the plurality of robots 20 are aligned in the serial state and the batteries 205 of the plurality of robots 20 are charged by one charger unit 10, the batteries 205 of the respective robots 20 can be charged safely within the range of the allowable current of the charger unit 10 and the power supply line.

Further, according to the second embodiment, in the first-in first-out system, the charger unit 10 preferentially charges the robot 20 that is parked first and is the closest to the charger unit 10 in such a way that the total charging current that flows through the batteries. 205 of the respective robots 20 does not exceed the allowable current of the charger unit 10 and the power supply line. Further, in the last-in first-out system, the charger unit 10 preferentially charges the robot 20 that is parked later and is the farthest from the charger unit 10 in such a way that the total charging current that flows through the batteries 205 of the respective robots 20 does not exceed the allowable current of the charger unit 10 and the power supply line.

Therefore, when the robot 20 connected to the charger unit 10 first is preferentially separated from the charger unit 10 and used or when the robot 20 connected to the charger unit 10 later is preferentially separated from the charger unit 10 and used, the battery 205 of the robot 20 that should be charged can be preferentially charged.

While the control is performed in such a way that the amount of the current that flows through the charger unit 10 and the power supply line does not exceed the allowable current by adjusting the number of robots 20 to be charged in the second embodiment, this embodiment is not limited thereto. For example, the charger unit 10 is able to control charging finely such as acquiring the charging current when the battery 205 is charged from each of the robots 20 and adjusting the number of robots 20 to be charged in accordance with the charging current.

(3) Third Embodiment

In the first embodiment, each of the robots 20 serves as a controller and executes control for switching the charging state and the non-charging state of the batteries 205 of the respective robots 20 in such a way that the total charging current that flows through the batteries 205 of the respective robots 20 does not exceed the allowable current of the charger unit 10 and the power supply line.

On the other hand, in the third embodiment, a management server 40 provided independently from the charger unit 10 and the robot 20 is included. Then the management server 40 serves as a controller, and executes control for switching the charging state and the non-charging state of the batteries 205 of the respective robots 20 in such a way that the total charging current that flows through the batteries 205 of the respective robots 20 does not exceed the allowable current of the charger unit 10 and the power supply line. The management server 40 may be provided in the vicinity of the charger unit 10 or may be located away from the charger unit 10.

Configuration of Third Embodiment

In the third embodiment, the management server 40 is added to the charging system compared to the configuration of the first embodiment (see FIGS. 21 and 22 etc. that will be described later). The external configurations and the block configurations of the charger unit 10 and the robot 20 are similar to those of the first embodiment.

Therefore, in the following description, only a block configuration of the management server 40 according to the third embodiment will be explained as a structure of the third embodiment.

Block Configuration of Management Server According to Third Embodiment

Figure 20:
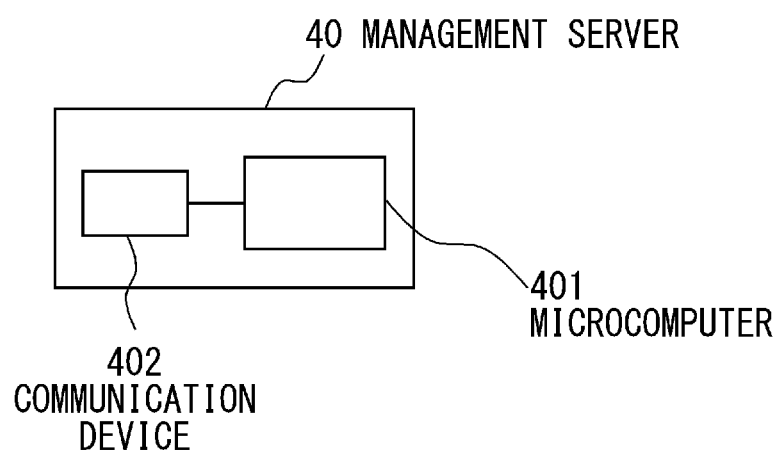
FIG. 20 is a block diagram showing one example of a block configuration of a management server according to a third embodiment.

FIG. 20 shows one example of the block configuration of the management server 40 according to the third embodiment.

The management server 40 shown in FIG. 20 includes a microcomputer 401 and a communication device 402.

The communication device 402 performs communication with an external device. In the third embodiment, the communication device 402 performs communication with the robot 20. Further, when the communication device 402 cannot directly communicate with the robot 20, the communication device 402 may indirectly communicate with the robot 20 via the charger unit 10. In this case, the charger unit 10 has a configuration including the communication device 105 shown in FIG. 15. While the communication system of the communication device 402 may be, for example, radio communication (e.g., wireless LAN communication, Bluetooth (registered trademark) communication), wired serial communication, or power communication, it is not particularly limited thereto.

The microcomputer 401 controls each of the components inside the management server 40 and executes the functions included in the management server 40.

In the third embodiment, the microcomputer 401 receives charging state information of the batteries 205 of the respective robots 20 from the respective robots 20 via the communication devices 402.

When the batteries 205 of the respective robots 20 are charged, the microcomputer 401 executes control for switching the charging state and the non-charging state of the batteries 205 of the respective robots 20 in such a way that the total charging current that flows through the batteries 205 of the respective robots 20 does not exceed the allowable current of the charger unit 10 and the power supply line based on the charging state information of the batteries 205 of the respective robots 20. Therefore, in the third embodiment, the microcomputer 401 of the management server 40 serves as a controller.

The microcomputer 401 sends the charging instruction to the robot 20 whose battery 205 will be charged via the communication device 402. On the other hand, the microcomputer 401 sends the charging stop instruction to the robot 20 whose battery 205 will not be charged via the communication device 402.

Operations of Third Embodiment

Next, operations of the charging system according to the third embodiment will be explained.

In the following description, similar to the descriptions in the first embodiment, the operations in the first-in first-out system and the operations in the last-in first-out system will be separately described.

Schematic Operations in First-in First-Out System According to Third Embodiment

Figure 21:
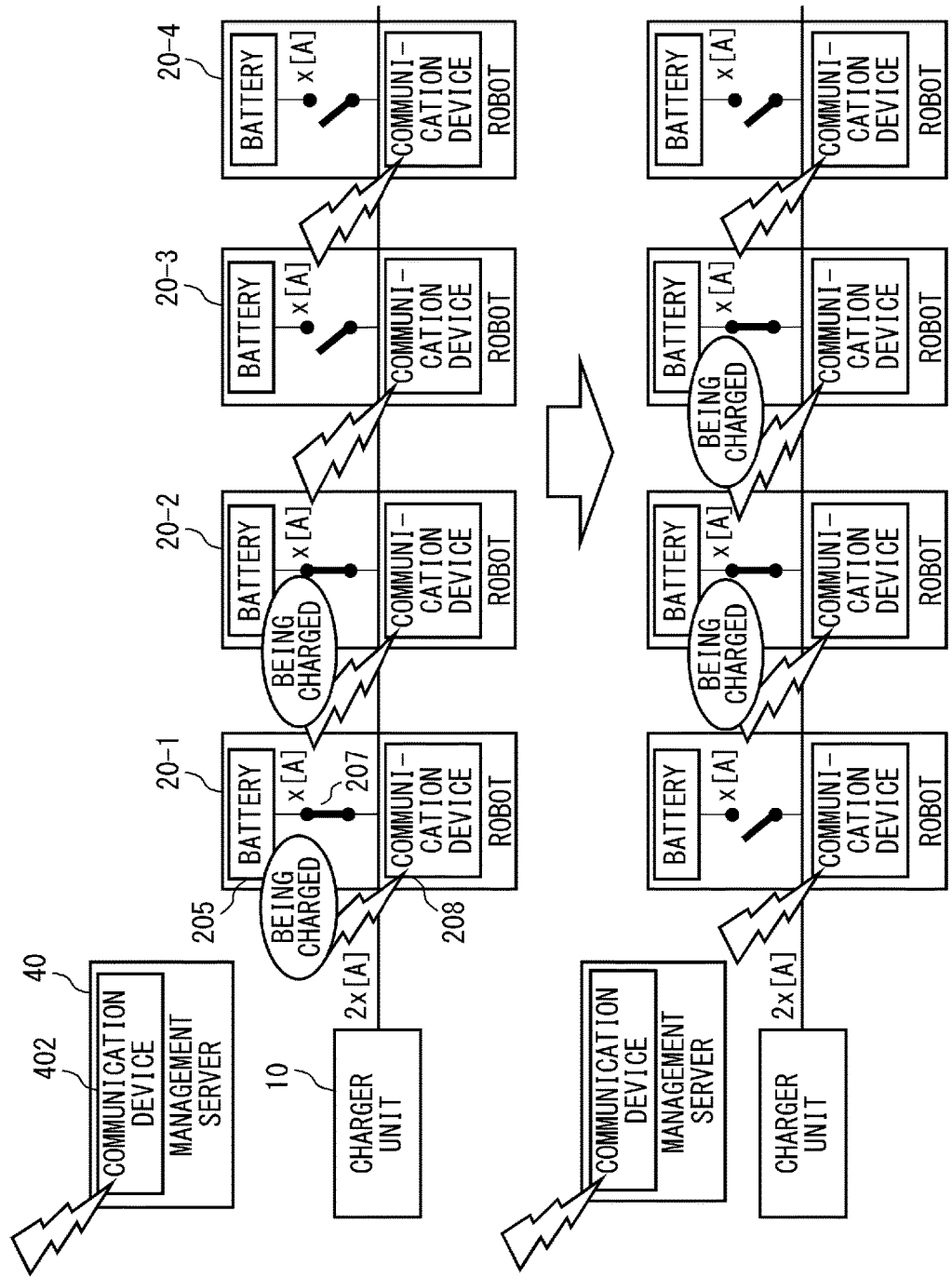
FIG. 21 is a diagram showing one example of schematic operations in the first-in first-out system in a charging system according to the third embodiment.

FIG. 21 shows one example of schematic operations in the first-in first-out system in the charging system according to the third embodiment. In FIG. 21, it is assumed that the management server 40 directly communicates' with the robot 20. Further, parts of the components of the robot 20 shown in FIG. 7 and the components of the management server 40 shown in FIG. 20 are selectively illustrated.

In FIG. 21, it is assumed that the robots 20-1 to 20-4 are connected to the charger unit 10 in this order and the robots 20-1 to 20-4 recognize the connection numbers indicating the order in which they are connected to the charger unit 10. It is further assumed that the management server 40 recognizes the connection numbers of the respective robots 20-1 to 20-4. It is further assumed that the allowable current of the charger unit 10 and the power supply line is 2x[A] and the maximum charging current of the battery 205 is x[A].

In order to lend the robot 20 having a sufficient amount of charge to the user, it is, useful to maximize the amount of charge in the robot 20 that, is released and used first. Therefore, in the first-in first-out system, the battery 205 of the robot 20 that is parked first and is the closest to the charger unit 10 is preferentially charged.

Further, the number of robots 20 that are being charged is controlled in such a way that the total charging current of the batteries 205 of the robots 20 that are being charged does not exceed the allowable current of the charger unit 10 and the power supply line. In FIG. 21, the allowable current of the charger unit 10 and the power supply line is 2x[A], and the maximum charging current of the battery 205 is x[A]. Therefore, charging is performed on the batteries 205 of the two robots 20.

In FIG. 21, the robots 20-1 to 20-4 send the respective connection numbers and the charging state information of the respective robots 20 to the management server 40 via the communication devices 208.

In this example, the two robots 20 that are parked first are the robots 20-1 and 20-2 whose connection numbers are "1" and "2". Therefore, first, the management server 40 sends the charging instruction to the two robots 20-1 and 20-2 via the communication devices 402, and the two robots 20-1 and 20-2 turn on the charging, switches 207, whereby the batteries 205 are charged. On the other hand, the management server 40 sends the charging stop instruction to the two robots 20-3 and 20-4 via the communication devices 402, and the two robots 20-3 and 20-4 turn off the charging switches 207 and stop charging the batteries 205.

Therefore, the robots 20-1 and 20-2 send the respective connection numbers and the charging state information indicating that they are being charged and the remaining charge amounts to the management server 40 via the communication devices 208. On the other hand, the robots 20-3 and 20-4 send the respective connection numbers and the charging state information indicating that they are not being charged and the remaining charge amounts to the management server 40 via the communication devices 208.

After that, when the battery 205 of the robot 20-1 is fully charged, the robot 20-1 turns off the charging switch 207, and the charging of the battery 205 is completed. Then the robot 20-1 sends the connection number "1" and the charging state information indicating that the battery 205 is not being charged and is in the fully-charged state to the management server 40 via the communication device 208.

At this time, the management server 40 recognizes, based on the charging state information of the respective robots 20-1 to 20-4, that the remaining charge amounts in the robots 20-2 to 20-4 are not the fully-charged level. The management server 40 further recognizes, based on the connection numbers of the respective robots 20-1 to 20-4, that the two robots 20 among the robots 20-2 to 20-4 that are parked first are the robots 20-2 and 20-3 whose connection numbers are "2" and "3". Therefore, the management server 40 does not send the charging instruction again to the robot 20-2 and causes the robot 20-2 to continue to charge the battery 205. Further, the management server 40 sends the charging, instruction to the robot 20-3 via the communication device 402, and the robot 20-3 turns on the charging switch 207, thereby starting charging the battery 205. Then the robot 20-3 sends the connection number "3" and the charging state information indicating that it is being charged and the remaining charge amount to the management server 40 via the communication device 208. The management server 40 may send the charging instruction or the charging stop instruction to all the robots 20-1 to 20-4 again when the management server 40 sends the charging instruction to the robot 20-3.

Schematic Operations in Last-in First-Out System According to Third Embodiment

Figure 22:
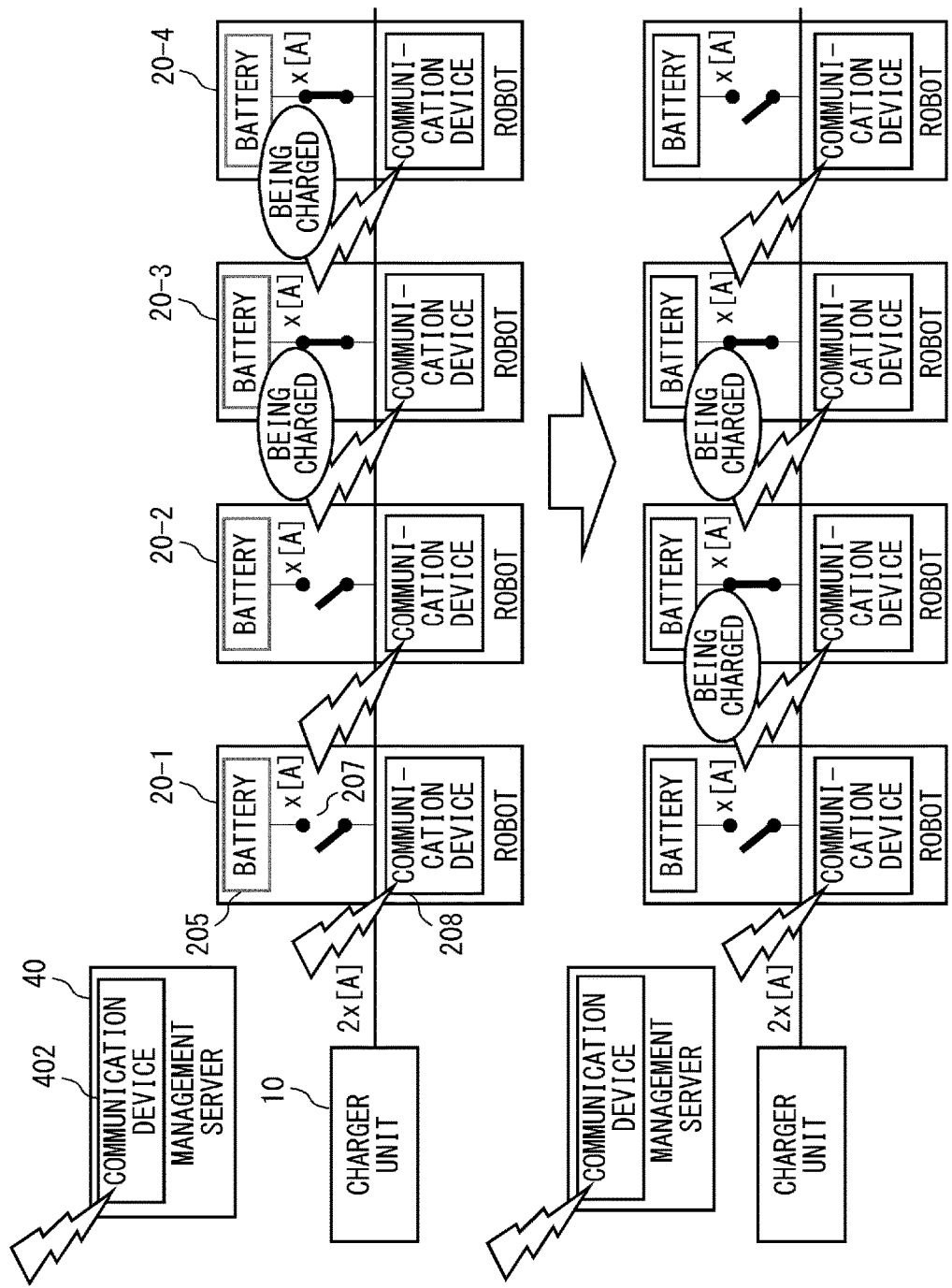
FIG. 22 shows one example of schematic operations in the last-in first-out system in the charging system according to the third embodiment.

FIG. 22 shows one example of schematic operations in the last-in first-out system in the charging system according to the third embodiment. In FIG. 22, it is assumed that the management server 40 directly communicates with the robot 20. Further, parts of the components of the robot 20 shown in FIG. 7 and the components of the management server 40 shown in FIG. 20 are selectively illustrated.

In FIG. 22, it is assumed that the robots 20-1 to 20-4 are connected to the charger unit 10 in this order and the robots 20-1 to 20-4 recognize the connection numbers indicating the order in which they are connected to the charger unit 10. It is further assumed that the management server 40 recognizes the connection numbers of the respective robots 20-1 to 20-4. It is further assumed that the allowable current of the charger unit 10 and the power supply line is 2x[A] and the maximum charging current of the battery 205 is x[A].

In order to lend the robot 20 having a sufficient amount of charge to the user, it is useful to maximize the amount of charge in the robot 20 that is released and used first. Therefore, in the last-in first-out system, the battery 205 of the robot 20 that is parked later and is the farthest from the charger unit 10 is preferentially charged.

Further, the number of robots 20 that are being charged is controlled in such a way that the total charging current of the batteries 205 of the robots 20 that are being charged does not exceed the allowable current of the charger unit 10 and the power supply line. In FIG. 22, the allowable current of the charger unit 10 and the power supply line is 2x[A], and the maximum charging current of the battery 205 is x[A]. Therefore, charging is performed on the batteries 205 of the two robots 20.

In FIG. 22, the robots 20-1 to 20-4 send the respective connection numbers and the charging state information of the respective robots 20 to the management server 40 via the communication devices 208.

In this example, the two robots 20 that are parked later are the robots 20-3 and 20-4 whose connection numbers are "3" and "4". Therefore, first, the management server 40 sends the charging instruction to the two robots 20-3 and 20-4 via the communication devices 402, and the two robots 20-3 and 20-4 turn on the charging switches 207, whereby the batteries 205 are charged. On the other hand, the management server 40 sends the charging stop instruction to the two robots 20-1 and 20-2 via the communication devices 402, and the two robots 20-1 and 20-2 turn off the charging switches 207 and stop charging the batteries 205.

Therefore, the robots 20-3 and 20-4 send the respective connection numbers and the charging state information indicating that they are being charged and the remaining charge amounts to the management server 40 via the communication devices 208. On the other hand, the robots 20-1 and 20-2 send the respective connection numbers and the charging state information indicating that they are not being charged and the remaining charge amounts to the management server 40 via the communication devices 208.

After that, when the battery 205 of the robot 20-4 is fully charged, the robot 20-4 turns off the charging switch 207, and the charging of the battery 205 is completed. Then the robot 20-4 sends the connection number "4" and the charging state information indicating that the battery 205 is not being charged and is in the fully-charged state to the management server 40 via the communication device 208.

At this time, the management server 40 recognizes, based on the charging state information of the respective robots 20-1 to 20-4, that the remaining charge amounts in the robots 20-1 to 20-3 are not the fully-charged level. The management server 40 further recognizes, based on the connection numbers of the respective robots 20-1 to 20-4, that the two robots 20 that are parked later among the robots 20-1 to 20-3 are the robots 20-2 and 20-3 whose connection numbers are "2" and "3". Therefore, the management server 40 does not send the charging instruction again to the robot 20-3, and causes the robot 20-3 to continue to charge the battery 205. Further, the management server 40 sends the charging instruction to the robot 20-2 via the communication device 402, and the robot 20-2 turns on the charging switch 207, thereby starting charging the battery 205. Then the robot 20-2 sends the connection number "2" and the charging state information indicating that it is being charged and the remaining charge amount to the charger unit 10 via the communication device 208. The management server 40 may send the charging instruction or the charging stop instruction to all the robots 20-1 to 20-4 again when it sends the charging instruction to the robot 20-2.

Operation Flow of Management Server 40 According to Third Embodiment

Next, an operation flow of the management server 40 according to the third embodiment will be explained.

Figure 23:
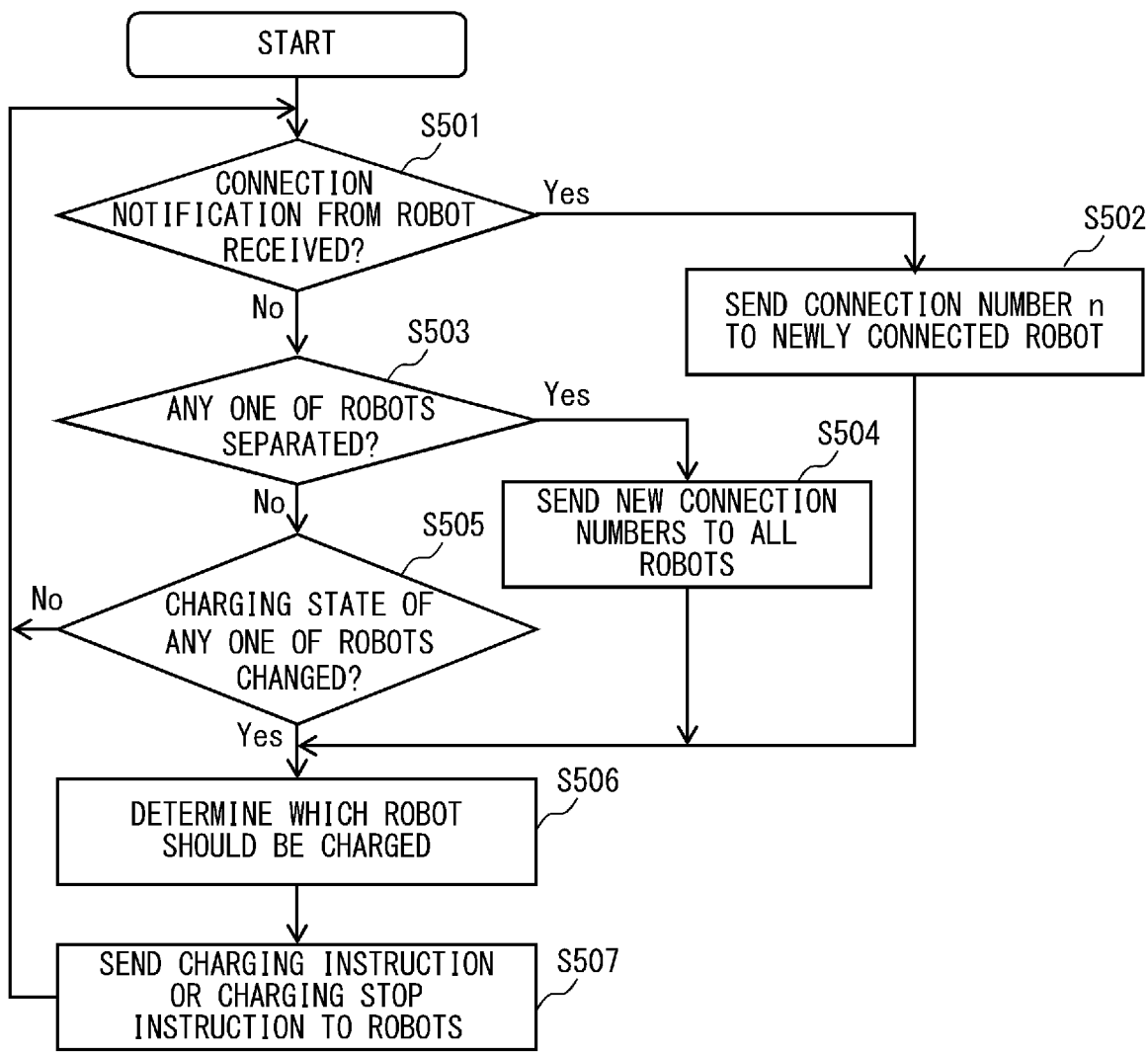
FIG. 23 is a flowchart showing one example of an operation flow of the management server according to the third embodiment.

FIG. 23 shows one example of the operation flow of the management server 40 according to the third embodiment. In FIG. 23, it is assumed that the robot 20 sends the connection notification to the management server 40 upon detecting that it has been electrically connected to the charger unit 10. It is further assumed that the robot 20 sends the connection number and the notification indicating that it has been separated from the charger unit 10 to the management server 40 when it is separated from the charger unit 10.

As shown in FIG. 23, the management server 40 determines whether it has received the connection notification from the robot 20 (Step S501).

When it is determined in Step S501 that the management server 40 has received the connection notification (Yes in Step S501), then the management server 40 allocates, based on the connection numbers of the other robots. 20 that have already been connected to the charger unit 10, the connection number n to the robot 20 that has been newly connected to the charger unit 10, and sends this connection number n to this robot 20 (Step S502). After that, the process goes to Step S506.

On the other hand, when it is determined in Step S501 that the management server 40 has not received the connection notification (No in Step S501), then the management server 40 determines whether any one of the robots 20 that have already been connected to the charger unit 10 has been separated from the charger unit 10 (Step S503).

When it is determined in Step S503 that any one of the robots 20 has been separated from the charger unit 10 (Yes in Step S503), then the management server 40 allocates new connection numbers to all the robots 20 that are connected to the charger unit 10 at this point and, sends these new connection numbers to all the robots 20 (Step S504). After that, the process goes to Step S506.

On the other hand, when it is determined in Step S503 that none of the robots 20 has been separated from the charger unit 10 (No in Step S503), then the management server 40 determines whether the charging state of any one of the robots 20 that are connected to the charger unit 10 at this point has been changed (Step S505). The determination method in Step S505 is similar to the method described in Step S405 of FIG. 18.

When it is determined in Step S505 that the charging state of any robot 20 has not changed (No in Step S505), the process goes back to Step S501. When the charging state of any one of the robots 20 has been changed (Yes in Step S505), the process goes to Step S506.

When there is a robot 20 that has been newly connected to the charger unit 10 (Yes in Step S501), when there is a robot 20 that has been separated from the charger unit 10 (Yes in Step S503), and when there is a robot 20 whose charging state has been changed (Yes in Step S505), the management server 40 determines, based on the connection number and the charging state information of the robot 20 that is connected to the charger unit 10 at this point, which battery 205 of which robot 20 should be charged (Step S506). The determination method in Step S506 is similar to the method described in Step S406 of FIG. 18.

After that, the management server 40 sends the charging instruction to the robot 20 whose battery 205 will be charged, and sends the charging stop instruction to the other robots 20 (Step S507). At this time, the management server 40 may send the charging instruction or the charging stop instruction to all, the robots 20 that are connected to the charger unit 10 at this point, or may send the charging instruction or the charging stop instruction only to the robot 20 where the content of the instruction has been changed.

Operations when Charger Units 10 of Multiple Systems are Included According to Third Embodiment While the configuration including the charger unit 10 of one system has been described in the third embodiment, this configuration may be changed to a configuration in which charger units 10 of multiple systems are included.

Figure 24:
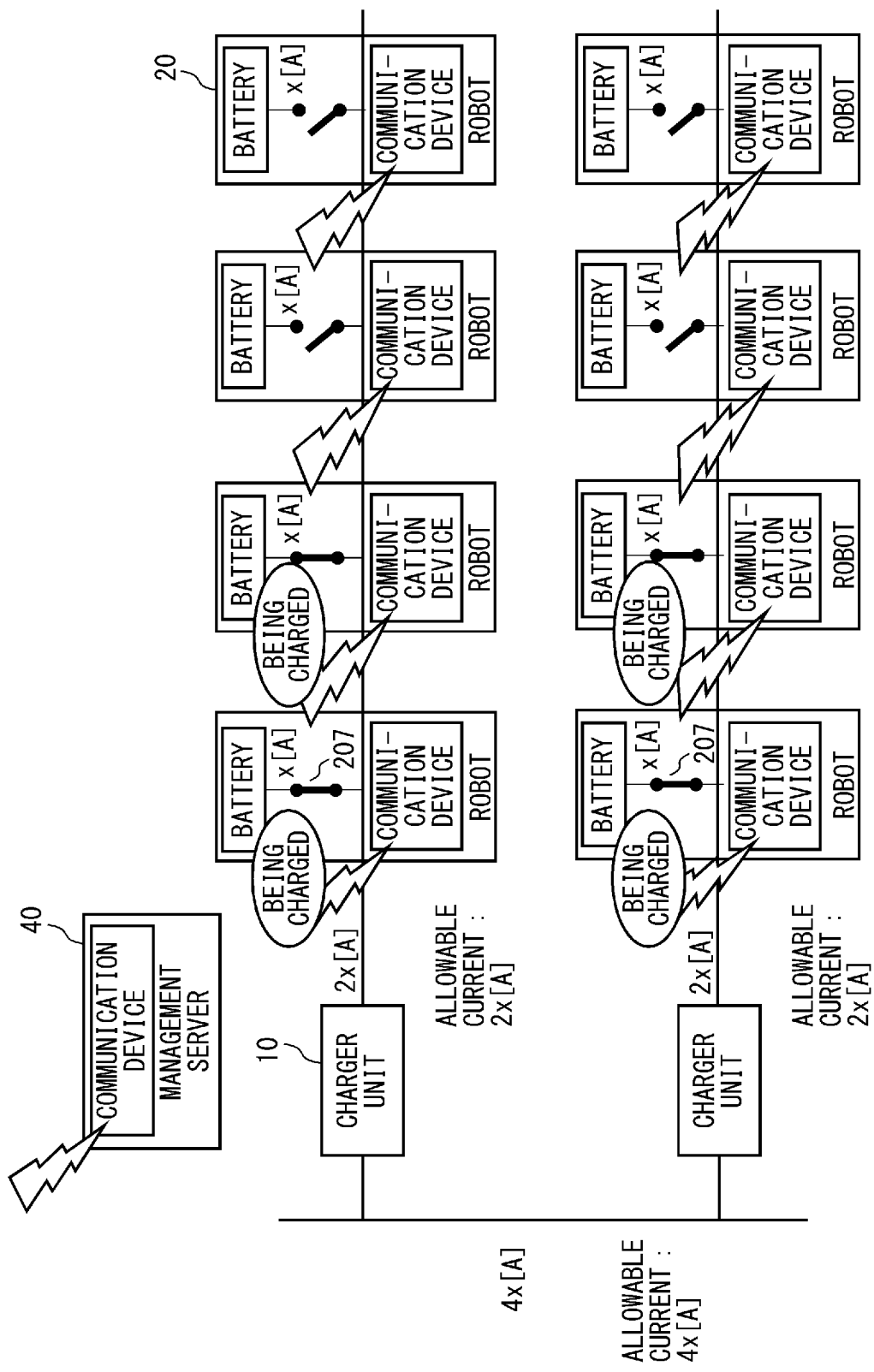
FIG. 24 is a diagram showing one example of schematic operations when charger units of two systems are included in the charging system according, to the third embodiment.

FIG. 24 shows one example of schematic operations when the charger units 10 of two systems are included in the charging system according to the third embodiment.

In FIG. 24, the allowable current of the charging equipment is 4x[A], the allowable current of the charger unit 10 and the power supply line is 2x[A], and the maximum charging current of the battery 205 is x[A].

Therefore, each of the charger units 10 of the two systems is supplied with the current of 2x[A]. Then in each of the two systems, the power supply line is supplied with the current of 2x[A] and charging is performed on the batteries 205 of the two robots 20.

Therefore, it is possible to execute control for switching the charging state and the non-charging state of the batteries 205 of the respective robots 20 in such a way that the total charging current that flows through the batteries 205 of the respective robots 20 does not exceed the allowable current of the charger unit 10 and the power supply line while limiting the power to be supplied to the charger unit 10.

Effects of Third Embodiment

As described above, according to the third embodiment, each of the robots 20 sends the charging state information of the battery 205 of itself to the management server 40. When the batteries 205 of the plurality of robots 20 are charged, the plurality of robots 20 are aligned in the serial state, the charger unit 10 and the plurality of robots 20 are electrically connected to each other, power is supplied from the charger unit 10 to the respective robots 20, and the batteries 205 of the plurality of robots 20 are charged by one charger unit 10. At this time, the management server 40 executes control for switching the charging state and the non-charging state of the batteries 205 of the respective robots 20 in such a way that the total charging current that flows through the batteries 205 of the respective robots 20 does not exceed the allowable current of the charger unit 10 and the power supply line based on the charging state information of the batteries 205 of the respective robots 20.

Therefore, when the plurality of robots 20 are aligned in the serial state and the batteries 205 of the plurality of robots 20 are charged by one charger unit 10, the batteries 205 of the respective robots 20 can be charged safely within the range of the allowable current of the charger unit 10 and the power supply line.

Further, according to the third embodiment, in the first-in first-out system, the management server 40 preferentially charges the robot 20 that is parked first and is the closest to the charger unit 10 in such a way that the total charging current that flows through the batteries 205 of the respective robots 20 does not exceed the allowable current of the charger unit 10 and the power supply line. Further, in the last-in first-out system, the management server 40 preferentially charges the robot 20 that is parked later and is the farthest from the charger unit 10 in such a way that the total charging current that flows through the batteries 205 of the respective robots 20 does not exceed the allowable current of the charger unit 10 and the power supply line.

Therefore, when the robot 20 connected to the charger unit 10 first is preferentially separated from the charger unit 10 and used or when the robot 20 connected to the charger unit 10 later is preferentially separated from the charger unit 10 and used, the battery 205 of the robot 20 that should be charged can be preferentially charged.

While the control is performed in such a way that the amount of the current that flows through the charger unit 10 and the power supply line does not exceed the allowable current by adjusting the number of robots 20 to be charged in the third embodiment, this embodiment is not limited thereto. For example, the management server 40 is able to control charging finely such as acquiring the charging current when the battery 205 is charged from each of the robots 20 and adjusting the number of robots 20 to be charged in accordance with the charging current.

(4) Fourth Embodiment

In the first to third embodiments, the amounts of power to be supplied to the respective robots 20 that charge the batteries 205 are constant.

On the other hand, in the fourth embodiment, the amounts of power to be supplied to the respective robots 20 that charge the batteries 205 are separately changed.

Structure of Fourth Embodiment

In the fourth embodiment, the block configuration of the robot 20 is different from that of the first embodiment, and the external configurations of the charger unit 10 and the robot 20 and the block configuration of the charger unit 10 are similar to those of the first embodiment.

Therefore, in the following description, only the block configuration of the robot 20 according to the fourth embodiment will be explained as the configuration of the fourth embodiment. In this example, the block configuration in which the charger unit 10 includes the charging connector 101 and the robot 20 includes the forward charging connector 201 and the backward charging connector 202 will be explained.

Block Configuration of Robot According to Fourth Embodiment

Figure 25:
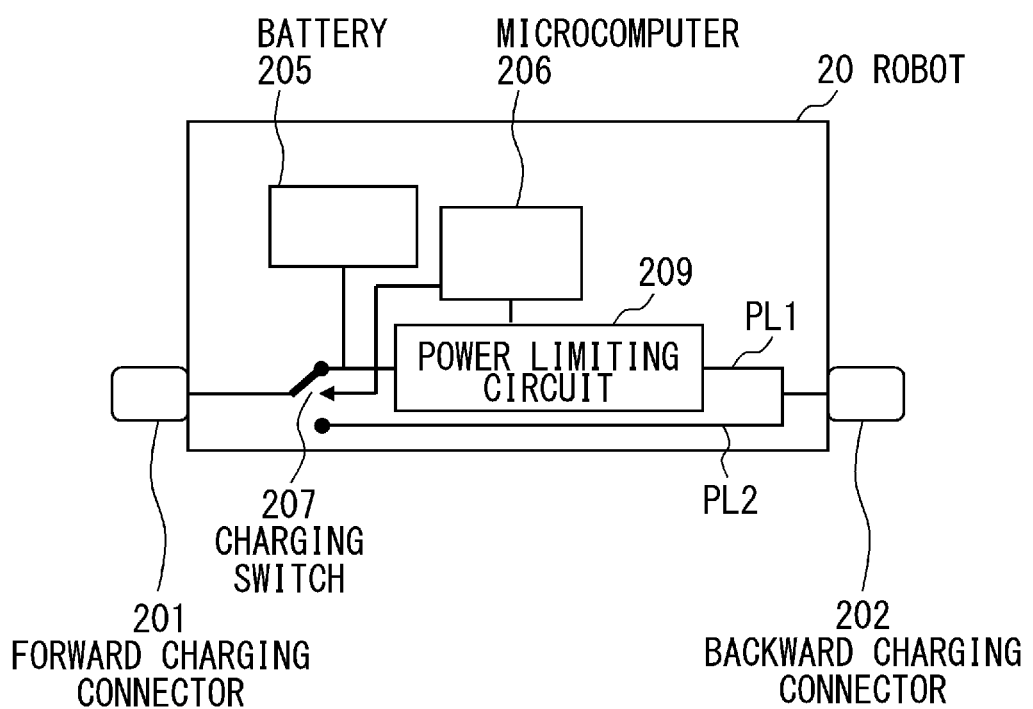
FIG. 25 is a block diagram showing one example of a block configuration of a robot according to a fourth embodiment.

FIG. 25 shows one example of the block configuration of the robot 20 according to the fourth embodiment.

The robot 20 shown in FIG. 25 is different from the one in the first embodiment shown in FIG. 7 in that the communication device 208 is not provided, a power limiting circuit 209 is additionally provided, and two power lines PL1 and PL2 are provided.

The power lines PL1 and PL2 are arranged in parallel to each other, and one end of each of the power lines PL1 and PL2 is electrically connected to the backward charging connector 202 and the other end of each of the power lines PL1 and PL2 is electrically connected to the charging switch 207 selectively.

The power limiting circuit 209 is arranged on the power line PL1. Further, the battery 205 is connected to the power line PL1 at the stage previous to the power limiting circuit 209.

The power limiting circuit 209 is a circuit that limits the power that has been directly or indirectly supplied from the charger unit 10 and has been input via the forward charging connector 201 and outputs the limited power to another robot 20 via the backward charging connector 202. The power limiting circuit 209 may limit the current, limit the voltage, or limit both the current and the voltage.

The charging switch 207 has one end connected to the forward charging connector 201 and the other end connected to the power line PL1 when it is in the ON state and to the power line PL2 when it is in the OFF state.

When the microcomputer 206 charges the battery 205, the microcomputer 206 turns on the charging switch 207, connects the charging switch 207 to the power line PL1, and supplies power to the battery 205. Further, when the battery 205 is not charged, the microcomputer 206 turns off the charging switch 207, connects the charging switch 207 to the power line PL2, and stops the power supply to the battery 205. When, for example, the battery 205 has been fully charged or the electric connection with the charger unit 10 has been interrupted, the battery 205 is not charged.

Accordingly, when the battery 205 is charged, the power input via the forward charging connector 201 is limited by the power limiting circuit 209 and the limited power is output via the backward charging connector 202. On the other hand, when the battery 205 is not charged, the power input via the forward charging connector 201 is directly output via the backward charging connector 202.

Operations of Fourth Embodiment

Next, operations of a charging system according to the fourth embodiment will be explained.

Schematic Operations According to Fourth Embodiment

Figure 26:
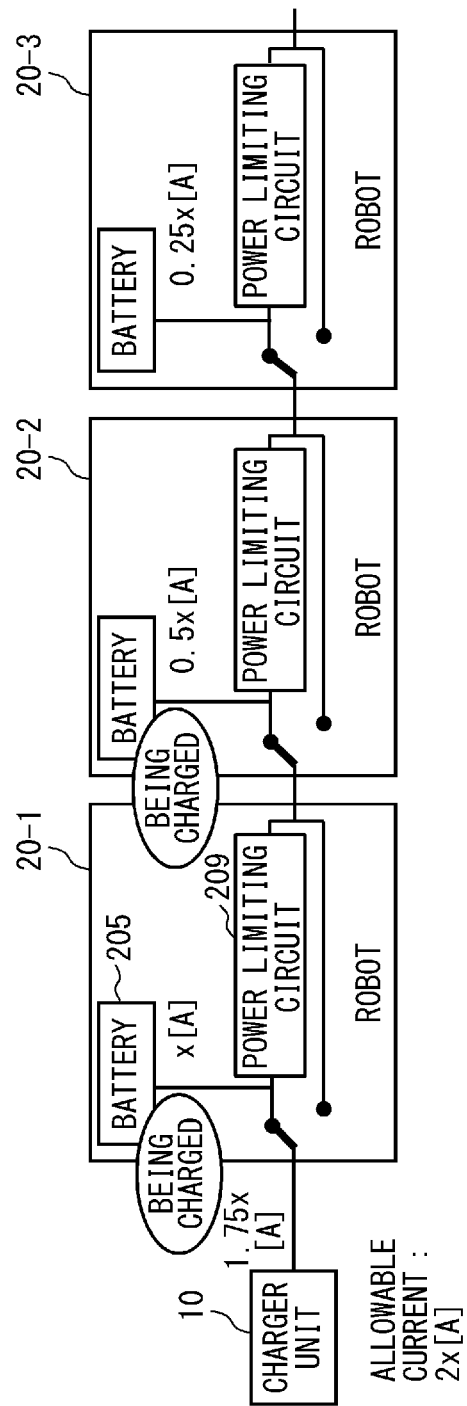
FIG. 26 is a diagram showing one example of schematic operations in a charging system according to the fourth embodiment.

FIG. 26 shows one example of schematic operations in the charging system according to the fourth embodiment. In FIG. 26, parts of the components of the robot 20 shown in FIG. 25 are selectively illustrated.

In FIG. 26, it is assumed that the robots 20-1 to 20-3 are connected to the charger unit 10 in this order. It is further assumed that the allowable current of the charger unit 10 and the power supply line is 2x[A] and the maximum charging current of the battery 205 is x[A]. It is further assumed that there is a charging condition that the battery 205 performs charging at a charging current higher than 0.4x[A]. It is further assumed that the power limiting circuit 209 limits the current.

As shown in FIG. 26, when the batteries 205 of the respective robots 20-1 to 20-3 are charged, the charging switches 207 of the respective robots 20-1 to 20-3 are turned on in such a way that the total charging current that flows through the batteries 205 of the respective robots 20-1 to 20-3 does not exceed the allowable current of the charger unit 10 and the power supply line.

Accordingly, in each of the robots 20-1 to 20-3, the charging switch 207 is connected to the power line PL1, that is, the power limiting circuit 209. Therefore, the power supplied from the charger unit 10 is limited by the power limiting circuit 209 in stages, and the amounts of power supplied to the respective robots 20-1 to 20-3 are separately changed.

Specifically, the robot 20-1 is supplied with power directly from the charger unit 10. Therefore, the power to be supplied to the robot 20-1 is not limited and the robot 20-1 charges the battery 205 at the charging current of x[A].

The robot 20-2 is supplied with power indirectly from the charger unit 10 via the robot 20-1. Therefore, the power to be supplied to the robot 20-2 is subjected to the current limitation by the power limiting circuit 209 of the robot 20-1. Therefore, the robot 20-1 charges the battery 205 at the charging current of 0.5x[A] as a result of the current limitation.

The robot 20-3 is supplied with power indirectly from the charger unit 10 via the robots 20-1 and 20-2. Therefore, the power to be supplied to the robot 20-3 is limited not only by the power limiting circuit 209 of the robot 20-1 but also by the power limiting circuit 209 of the robot 20-2. Therefore, the charging current in the robot 20-3 becomes 0.25x[A] as a result of the current limitation. However, this charging current does not satisfy the charging condition of the battery 205. Therefore, the battery 205 is not charged.

As described above, the power supplied from the charger unit 10 is limited in stages by the power limiting circuits 209 of the robots 20. As a result, the total charging current that flows through the batteries 205 of the respective robots 20-1 to 20-3 becomes 1.75x (=x+0.5x+0.25x) [A], which falls within the range of the allowable current 2x[A] of the charger unit 10 and the power supply line. Further, the power that has been subjected to the current limitation by the power limiting circuits 209 in stages eventually reaches the power amount that does not satisfy the charging condition of the battery 205. As a result, the battery 205 of the robot 20 where the power that has been indirectly supplied from the charger unit 10 does not satisfy the charging condition of the battery 205 is not charged.

Operation Flow of Robot According to Fourth Embodiment

Next, an operation flow of the robot 20 according to the fourth embodiment will be explained.

Figure 27:
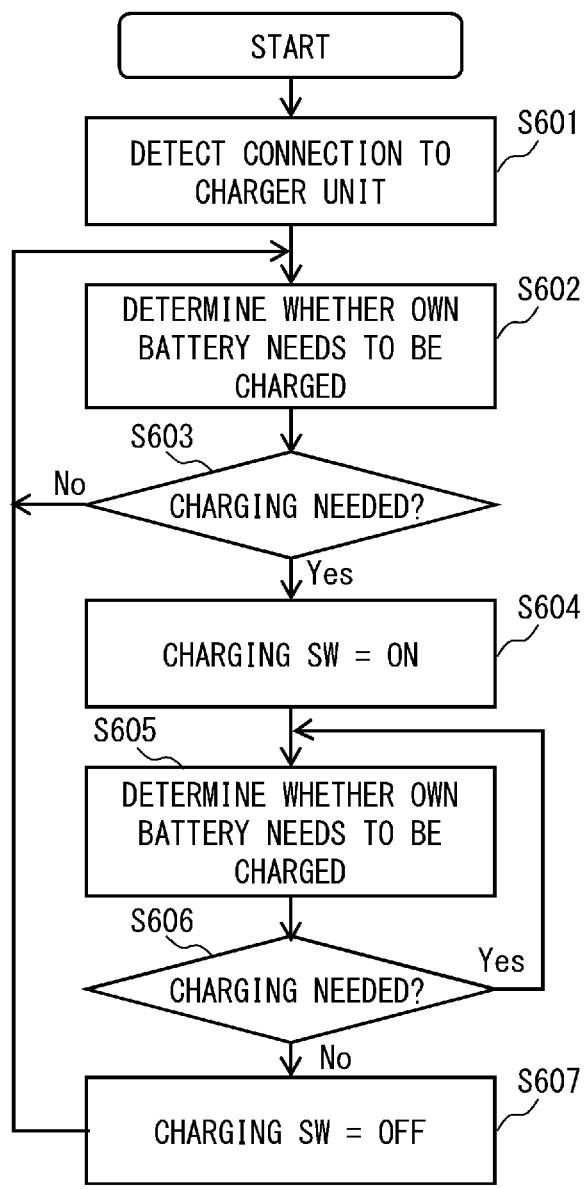
FIG. 27 is a flowchart showing one example of an operation flow when the robot is connected to the charger unit and it is charged in the robot according to the fourth embodiment.

FIG. 27 shows one example of an operation flow when the robot 20 is connected to the charger unit 10 and it is charged in the robot 20 according to the fourth embodiment.

As shown in FIG. 27, when the robot 20 detects that it has been electrically connected to the charger unit 10 (Step. S601), the robot 20 determines whether the battery 205 needs to be charged (Step S602).

In Step S602, when, for example, the battery 205 has not been fully charged, it is determined that the battery 205 needs to be charged. On the other hand, when the battery 205 has been fully charged, the robot 20 determines that there is no need to charge the battery 205.

When the result of the determination in Step S602 shows that the battery 205 needs not be charged (No in Step S603), the process goes back to Step S601.

On the other hand, when the result of the determination in Step S602 shows that the battery 205 needs to be charged (Yes in Step S603), then the robot 20 turns on the charging switch 207 and connects the charging switch 207 to the power line PL1, thereby starting charging the battery 205 (Step S604).

In the following processing, the robot 20 continues to determine whether the battery 205 needs to be charged (Step S605). The determination method in Step S605 is similar to the method described in Step S602.

When the result of the determination in Step S605 shows that the battery 205 needs to be charged (Yes in Step S606), the process goes back to Step S605.

On the other hand, when the result of the determination in Step S605 shows that the battery 205 needs not be charged (No in Step S606), then the robot 20 turns off the charging switch 207, connects the charging switch 207 to the power line PL2, and stops charging the battery 205 (Step S607). After that, the process goes back to Step S602.

Figure 28:
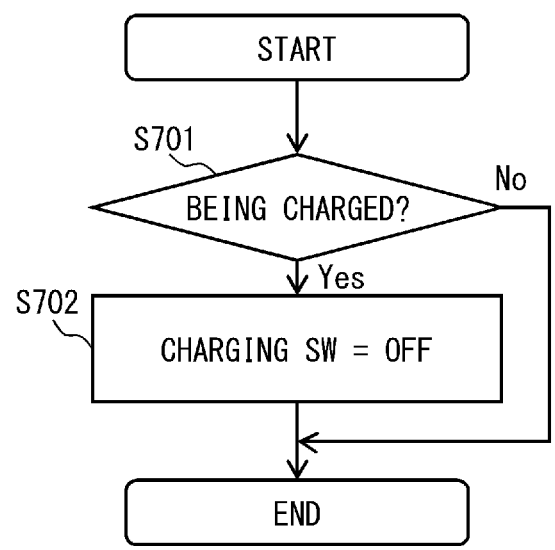
FIG. 28 is a flowchart showing one example of an operation flow when the robot is separated from the charger unit in the robot according to the fourth embodiment.

FIG. 28 shows one example of an operation flow when the robot 20 is separated from the charger unit 10 in the robot 20 according to the fourth embodiment.

As shown in FIG. 28, the robot 20 determines whether it is being charged (Step S701). When it is determined in Step S701 that it is not being charged (No in Step S701), the processing is ended.

On the other hand, when it is determined in Step S701 that the robot 20 is being charged (Yes in Step S701), then the robot 20 turns off the charging switch 207, connects charging switch 207 to the power line PL2, and stops charging the battery 205 (Step S702). After that, the processing is ended.

Effects of Fourth Embodiment

As described above, according to the fourth embodiment, each, of the robots 20 includes the power limiting circuit 209 that limits the power that has been directly or indirectly supplied from the charger unit 10 and has been input via the forward charging connector 201 and outputs the limited power to another robot 20 via the backward charging connector 202. When the batteries 205 of the plurality of robots 20 are charged, the plurality of robots 20 are aligned in the serial state, the charger unit 10 and the plurality of robots 20 are electrically connected to each other, power is supplied from the charger unit 10 to the respective robots 20, and the batteries 205 of the plurality of robots 20 are charged by one charger unit 10. At this time, the amounts of power to be supplied to the respective robots 20 are separately changed by limiting the power supplied from the charger unit 10 by the power limiting circuits 209 in stages in such a way that the total charging current that flows through the batteries 205 of the respective robots 20 does not exceed the allowable current of the charger unit 10 and the power supply line.

Therefore, when the plurality of robots 20 are aligned in the serial state and the batteries 205 of the plurality of robots 20 are charged by one charger unit 10, the batteries 205 of the respective robots 20 can be charged safely within the range of the allowable current of the charger unit 10 and the power supply line.

Further, each of the robots 20 is able to charge the battery 205 safely within the range of the individual power amount that has been limited.

In the fourth embodiment, it is recognized that, since the robot 20 that is parked first and is the closest to the charger unit 10 is not subjected to the current limitation, the amount of power to be supplied to this robot 20 becomes large and the amount of charge becomes large. Therefore, when the robot 20 according to the fourth embodiment is used in the form of the sharing, the first-in first-out system is suitable in order to lend the robot 20 having, a sufficient amount of charge to the user.

The present disclosure is not limited to the aforementioned embodiments and may be changed as appropriate without departing from the spirit of the present disclosure.

For example, while the example in which the electric autonomous moving body is a robot (personal mobility robot) has been described in the aforementioned embodiments, the electric autonomous moving body is not limited thereto. It is sufficient that the electric autonomous moving body be an electric autonomous moving body having a battery such as other robots (a cleaning robot etc.), an electric automobile, an electric shopping cart etc.

Figure 29:
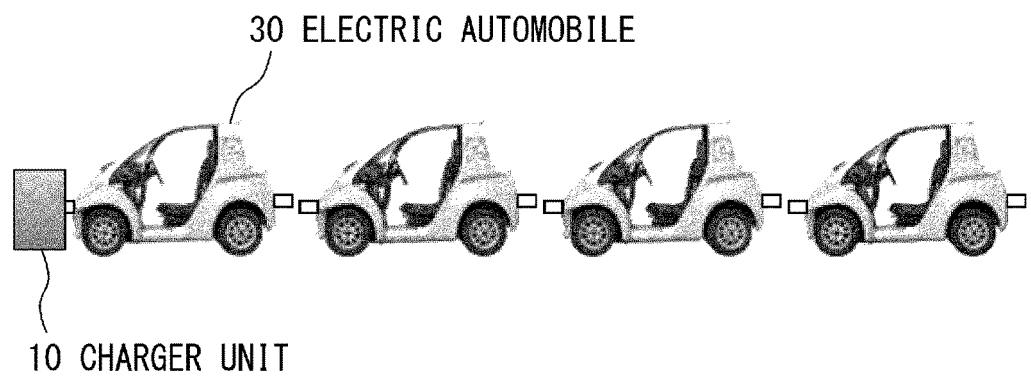
FIG. 29 is an external side view showing one example of an external configuration of a charging system according to a modified example of the first to fourth embodiments.
Figure 30:
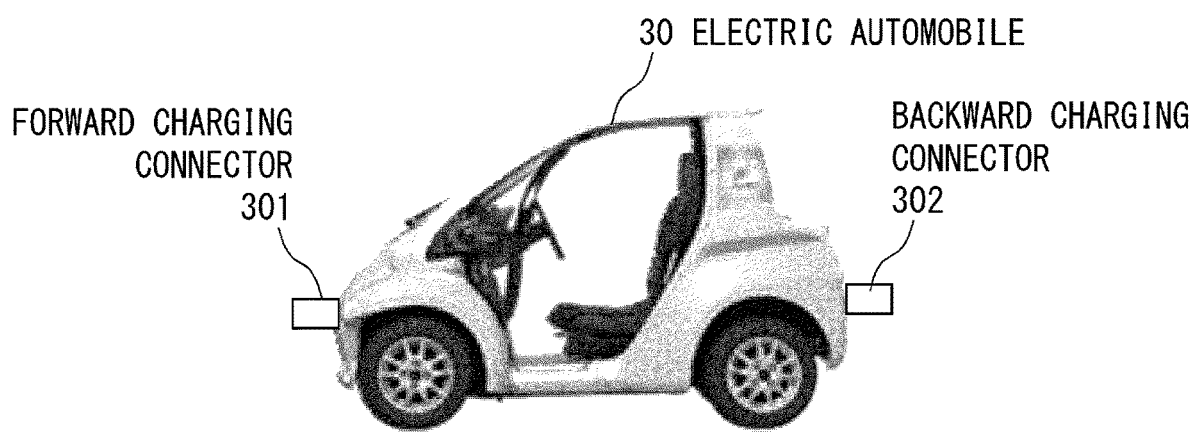
FIG. 30 is an external side view showing one example of an external configuration of an electric automobile according to the modified example of the first to fourth embodiments.

FIG. 29 shows one example of an external configuration of a charging system when an electric automobile is used as the electric autonomous moving body, and FIG. 30 shows one example of the external configuration of the electric automobile shown in FIG. 29.

In the charging system shown in FIGS. 29 and 30, the robot 20 is replaced by an electric automobile 30, and the electric automobile 30 includes a forward charging connector 301 and a backward charging connector 302, similar to the robot 20. Further, the electric automobile 30 may include a forward non-contact charging terminal and a backward non-contact charging terminal in place of the forward charging connector 301 and the backward charging connector 302.

Further, some or all of the aforementioned first to fourth embodiments may be combined as appropriate. Specifically, the aforementioned fourth embodiment may be, for example, combined with the aforementioned first to third embodiments.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of charging an electric autonomous moving body by a charging system in which a plurality of electric autonomous moving bodies including batteries are aligned in a serial state, a charger unit and the plurality of electric autonomous moving bodies are electrically connected to each other, power is supplied from the charger unit to the respective electric autonomous moving bodies, and the batteries of the plurality of electric autonomous moving bodies are charged, wherein the charger unit is provided with connection member electrically connected to the electric autonomous moving body, each of the electric autonomous moving bodies is provided with a first connection capable of being electrically connected to the connection member of the charger unit and a second connection member capable of being electrically connected to the first connection member of another one of the electric autonomous moving bodies, the charging system comprises a controller configured to execute control for switching a charging state and a non-charging state of the batteries of the respective electric autonomous moving bodies in such a way that a battery of the electric autonomous moving body that is the closest to the charger unit or a battery of the electric autonomous moving body that is the farthest from the charger unit among the electric autonomous moving bodies that are electrically connected to the charger unit is preferentially charged, each of the electric autonomous moving bodies includes a communication function; and when the plurality of electric autonomous moving bodies are aligned in the serial state, the charger unit and the plurality of electric autonomous moving bodies are electrically connected to each other via the connection member, the first connection member, and the second connection member, and the batteries of the plurality of electric autonomous moving bodies are charged, each of the electric autonomous moving bodies sends charging state information indicating the charging state of the battery of the electric autonomous moving body and the controller executes control for switching the charging state and the non-charging state of the batteries of the respective electric autonomous moving bodies based on the charging state information of the batteries of the respective electric autonomous moving bodies in such a way that the total amount of current that flows through the batteries of the respective electric autonomous moving bodies does not exceed an allowable current of the charger unit and a power supply line.

2. The method of charging the electric autonomous moving body according to claim 1, wherein each of the electric autonomous moving bodies is provided with a power limiting circuit configured to limit the power that has been directly or indirectly supplied from the charger unit and has been input via the first connection member and output the limited power to the other electric autonomous moving bodies via the second connection member, and the amounts of power to be supplied to the respective electric autonomous moving bodies are separately changed by the power limiting circuit in such a way that the total amount of power that flows through the batteries of the respective electric autonomous moving bodies does not exceed the allowable current of the charger unit and the power supply line.

3. The method of charging the electric autonomous moving body according to claim 1, wherein each of the connection member, the first connection member, and the second connection member is a charging connector or a non-contact charging terminal.

4. A method of charging an electric autonomous moving body by a charging system in which a plurality of electric autonomous moving bodies including batteries are aligned in a serial state, a charger unit and the plurality of electric autonomous moving bodies are electrically connected to each other, power is supplied from the charger unit to the respective electric autonomous moving bodies, and the batteries of the plurality of electric autonomous moving bodies are charged, wherein

- the charger unit is provided with connection member electrically connected to the electric autonomous moving body,
- each of the electric autonomous moving bodies is provided with a first connection capable of being electrically connected to the connection member of the charger unit and a second connection member capable of being electrically connected to the first connection member of another one of the electric autonomous moving bodies,
- each of the electric autonomous moving bodies is provided with a power limiting circuit configured to limit the power that has been directly or indirectly supplied from the charger unit and has been input via the first connection member and output the limited power to the other electric autonomous moving bodies via the second connection member,
- the amounts of power to be supplied to the respective electric autonomous moving bodies are separately changed by the power limiting circuit in such a way that the total amount of power that flows through the batteries of the respective electric autonomous moving bodies does not exceed the allowable current of the charger unit and the power supply line,
- the charging system comprises a controller configured to execute control for switching a charging state and a non-charging state of the batteries of the respective electric autonomous moving bodies,
- each of the electric autonomous moving bodies includes a communication function; and
- when the plurality of electric autonomous moving bodies are aligned in the serial state, the charger unit and the plurality of electric autonomous moving bodies are electrically connected to each other via the connection member, the first connection member, and the second connection member, and the batteries of the plurality of electric autonomous moving bodies are charged, each of the electric autonomous moving bodies sends charging state information indicating the charging state of the battery of the electric autonomous moving body and the controller executes control for switching the charging state and the non-charging state of the batteries of the respective electric autonomous moving bodies based on the charging state information of the batteries of the respective electric autonomous moving bodies in such a way that the total amount of current that flows through the batteries of the respective electric autonomous moving bodies does not exceed an allowable current of the charger unit and a power supply line.

5. The method of charging the electric autonomous moving body according to claim 4, wherein each of the connection member, the first connection member, and the second connection member is a charging connector or a non-contact charging terminal.

* * * * *